United States Patent
Yoshimoto et al.

(10) Patent No.: US 7,285,352 B2
(45) Date of Patent: Oct. 23, 2007

(54) SEPARATOR FOR FUEL CELL AND FUEL CELL THEREWITH

(75) Inventors: Yasunori Yoshimoto, Ashikaga (JP); Akira Hamada, Ashikaga (JP); Takaaki Matsubayashi, Gunma (JP); Mitsuo Karakane, Gunma (JP); Takashi Kawanabe, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 442 days.

(21) Appl. No.: 10/725,215

(22) Filed: Dec. 2, 2003

(65) Prior Publication Data

US 2004/0110057 A1    Jun. 10, 2004

(30) Foreign Application Priority Data

| Dec. 2, 2002 | (JP) | ............................. 2002-350548 |
| Dec. 2, 2002 | (JP) | ............................. 2002-350560 |
| Dec. 25, 2002 | (JP) | ............................. 2002-375619 |
| Dec. 27, 2002 | (JP) | ............................. 2002-380099 |

(51) Int. Cl.
  *H01M 8/02* (2006.01)
  *H01M 8/10* (2006.01)
(52) U.S. Cl. ............................. 429/38; 429/32; 429/34; 429/39
(58) Field of Classification Search ................ 429/32, 429/34, 38, 39
   See application file for complete search history.

(56) References Cited

U.S. PATENT DOCUMENTS 4,124,478 A * 11/1978 Tsien et al. ................. 204/255
4,274,939 A * 6/1981 Bjaareklint ................. 204/257
6,214,486 B1 * 4/2001 Okamoto ..................... 429/13
6,326,095 B1 * 12/2001 Kneidel ....................... 429/19
6,387,557 B1 * 5/2002 Krasij et al. ................. 429/32

FOREIGN PATENT DOCUMENTS

| JP | 63-972 | 1/1988 |
| JP | 4-8260 | 1/1992 |
| JP | 6-98777 | 4/1994 |
| JP | 2000-149966 A | 5/2000 |
| JP | 2000-294261 A | 10/2000 |

(Continued)

OTHER PUBLICATIONS

Notification of Reason(s) for Refusal; Dispatch Date: Nov. 15, 2005; Dispatch No. 423800.

(Continued)

*Primary Examiner*—Gregg Cantelmo
(74) *Attorney, Agent, or Firm*—McDermott Will & Emery LLP

(57) ABSTRACT

An objective of this invention is to provide a separator for a fuel cell whereby a fuel, air or cooling water can be evenly and efficiently fed. In a separator for a fuel cell comprising fuel channels 105 in one side and cooling water channels 106 in the other side, the regions where the fuel channels 105 and the cooling water channels 106 are formed rectangular. The fuel gas is fed from a first fuel-feeding manifold 107 and discharged from a first fuel-discharging manifold 109 to the outside of the cell. The cooling water is fed from a first cooling-water-feeding manifold 111 and discharged from a first cooling-water-discharging manifold 113 to the outside of the cell.

10 Claims, 28 Drawing Sheets

FOREIGN PATENT DOCUMENTS

| | | |
|---|---|---|
| JP | 2001-43869 A | 2/2001 |
| JP | 2001-43888 A | 2/2001 |
| JP | 2001-266910 | 9/2001 |
| JP | 2001-307753 | 11/2001 |
| JP | 2001-307753 A | 11/2001 |
| JP | 2002-25586 A | 1/2002 |
| JP | 2002-151120 | 5/2002 |
| WO | WO 00/39872 | 7/2000 |
| WO | WO 01/013441 | 2/2001 |

OTHER PUBLICATIONS

Notification of Reason(s) for Refusal; Dispatch Date: Nov. 15, 2005; Dispatch No. 427581.

Japanese Office Action issued in corresponding Japanese Patent Application No. JP 2002-380099, dated Aug. 29, 2006.

Japanese Office Action issued in corresponding Japanese Patent Application No. JP 2002-375619, dated Aug. 29, 2006.

* cited by examiner

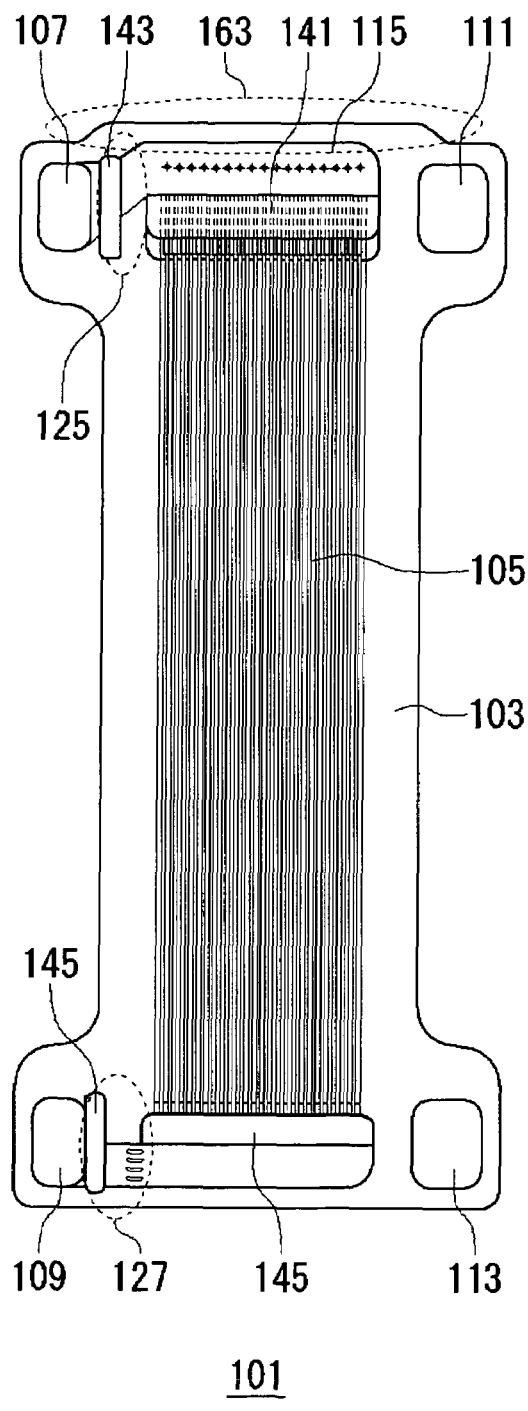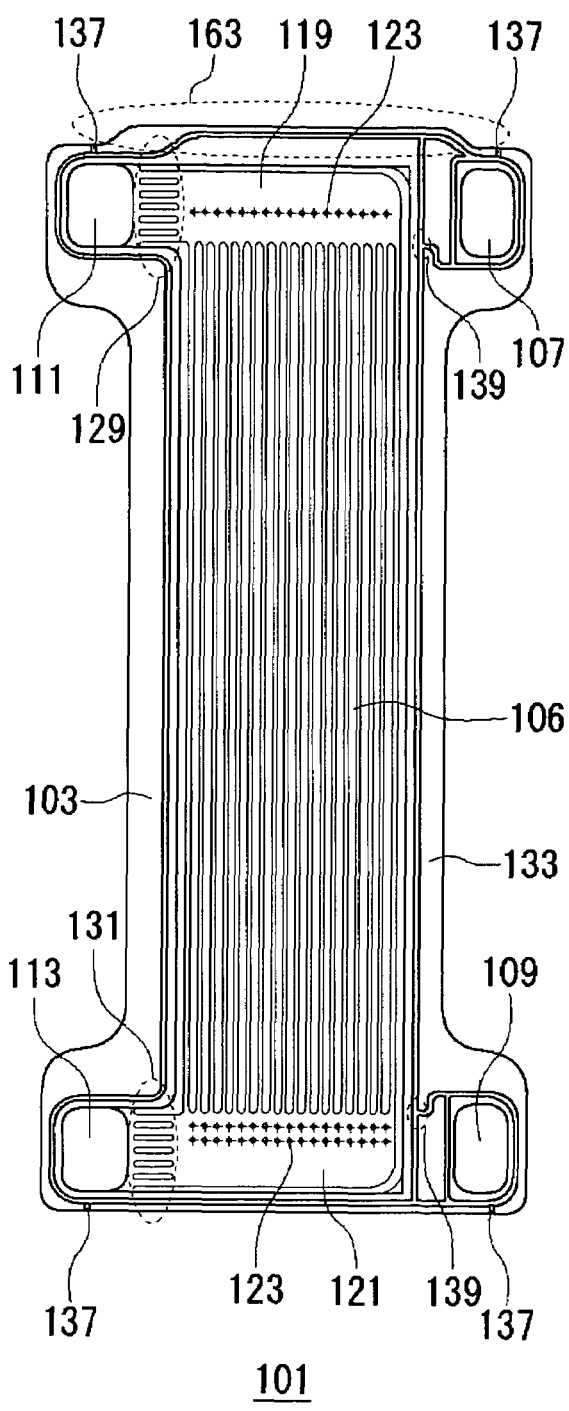

147

147

START → PREPARATION OF A COMPOUND (S100) → COLD FORMING (S101) → FILLING (S102) → COMPRESSION (S103) → FINISHED SEPARATOR (S104)

FIG.15A
FIG.15B
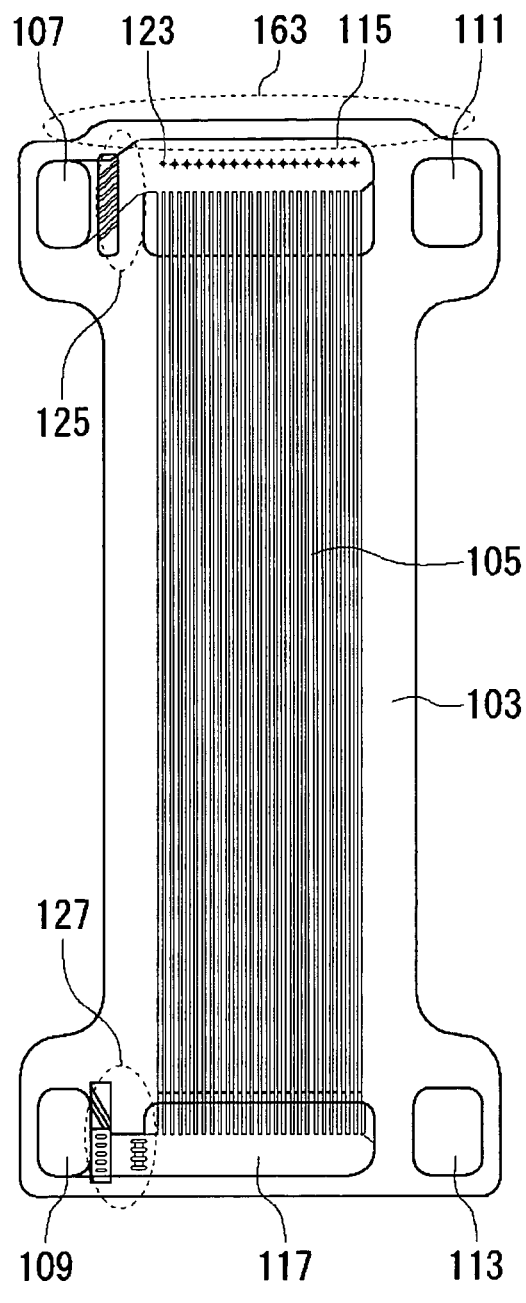
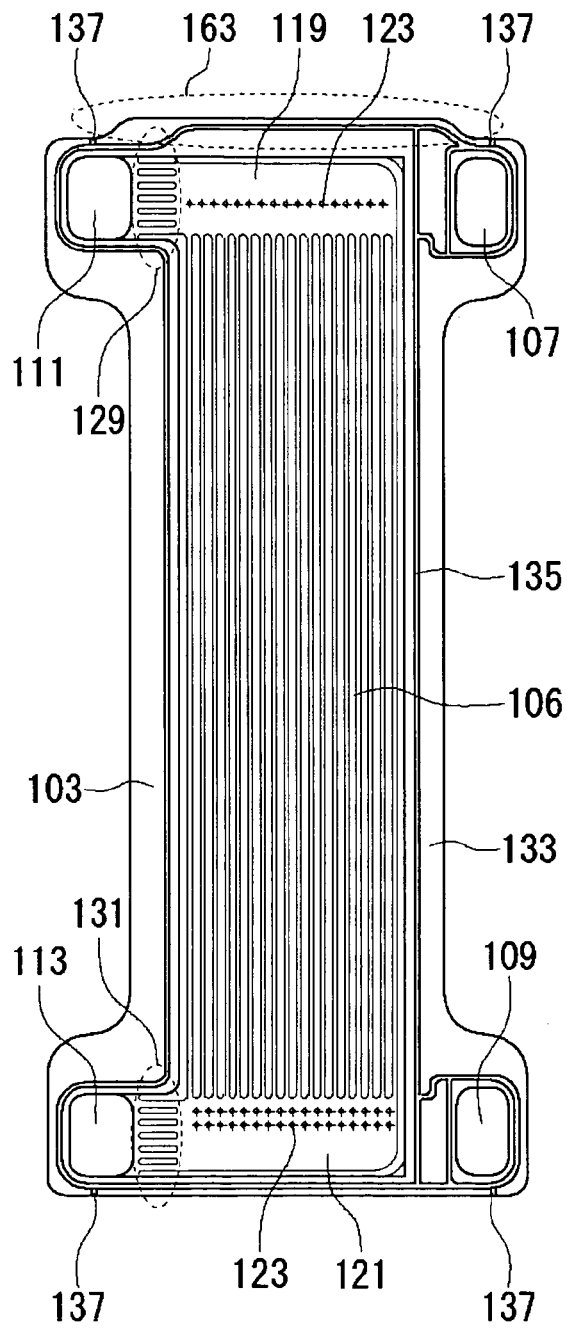

FIG.16A
FIG.16B
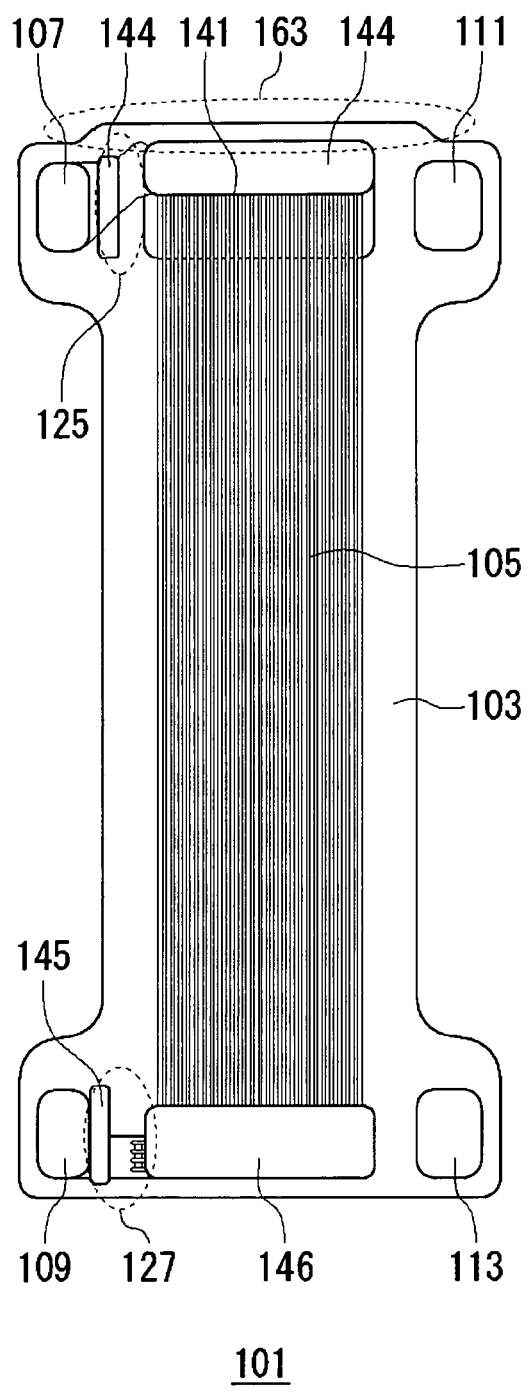
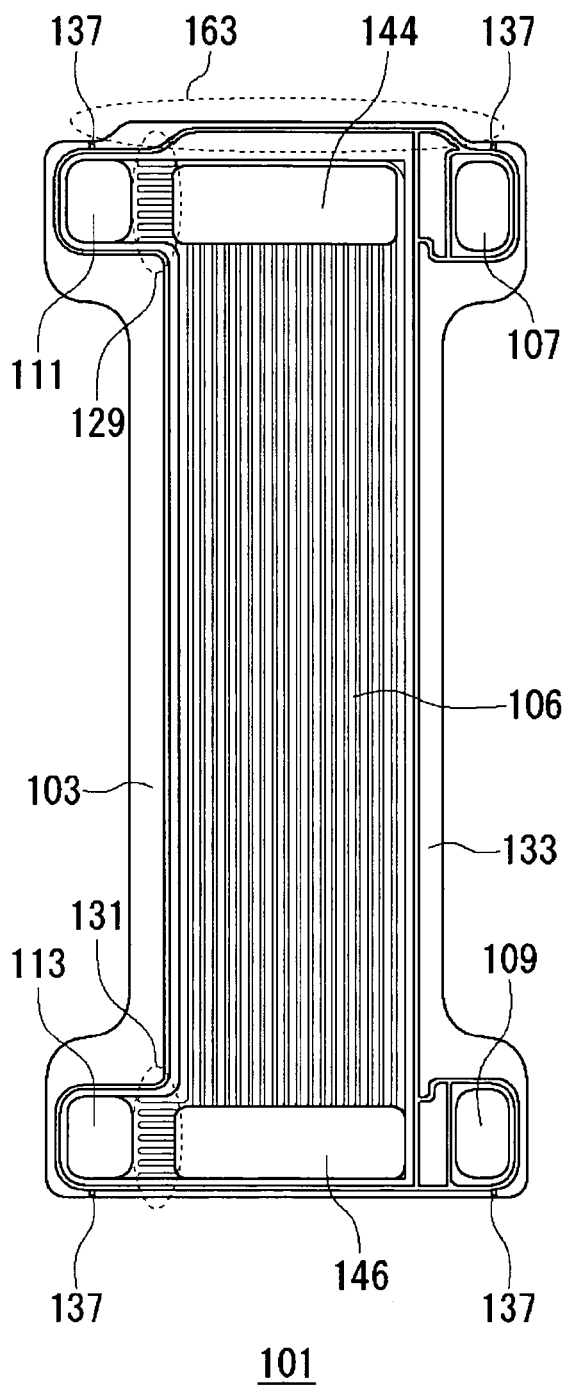

FIG.17A
FIG.17B
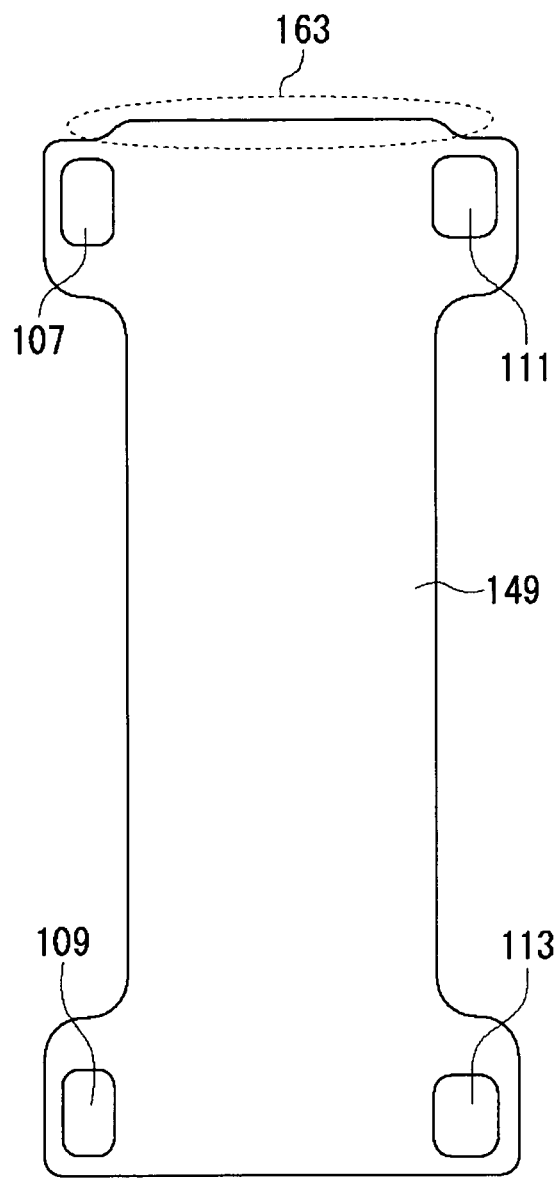
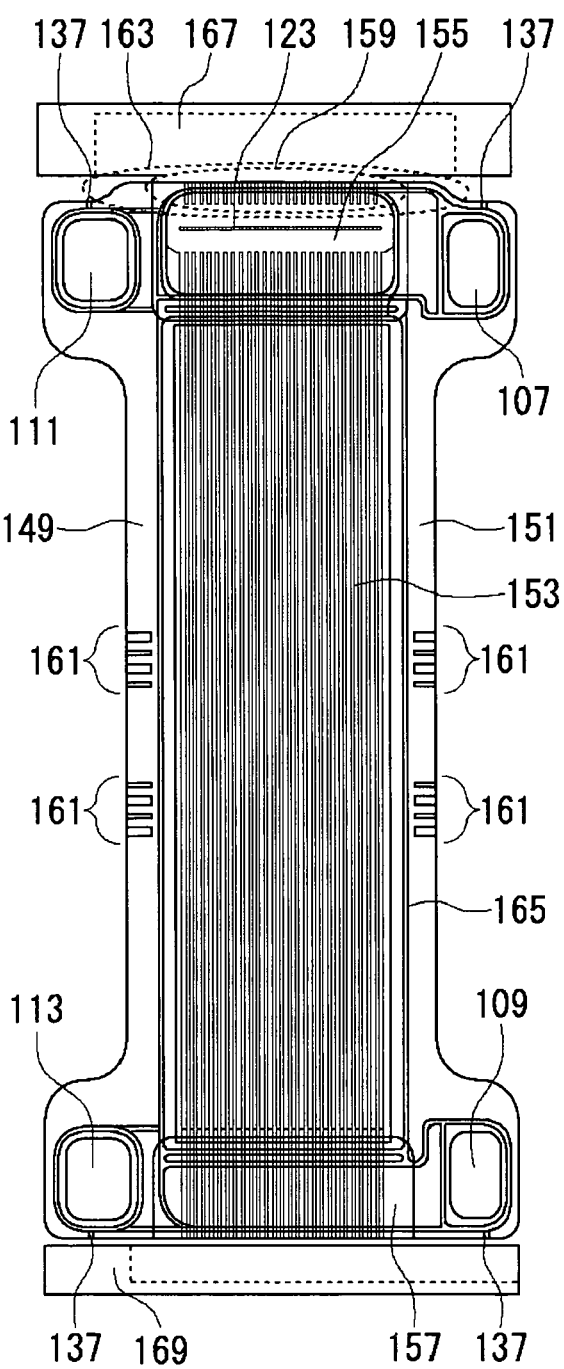

FIG.18A
FIG.18B
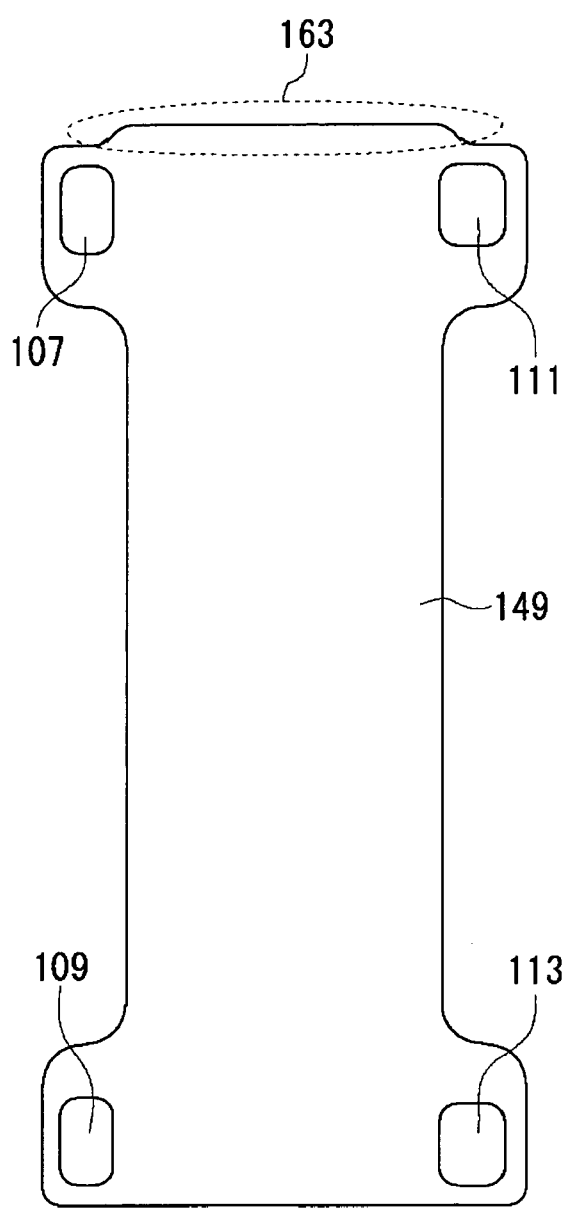
147
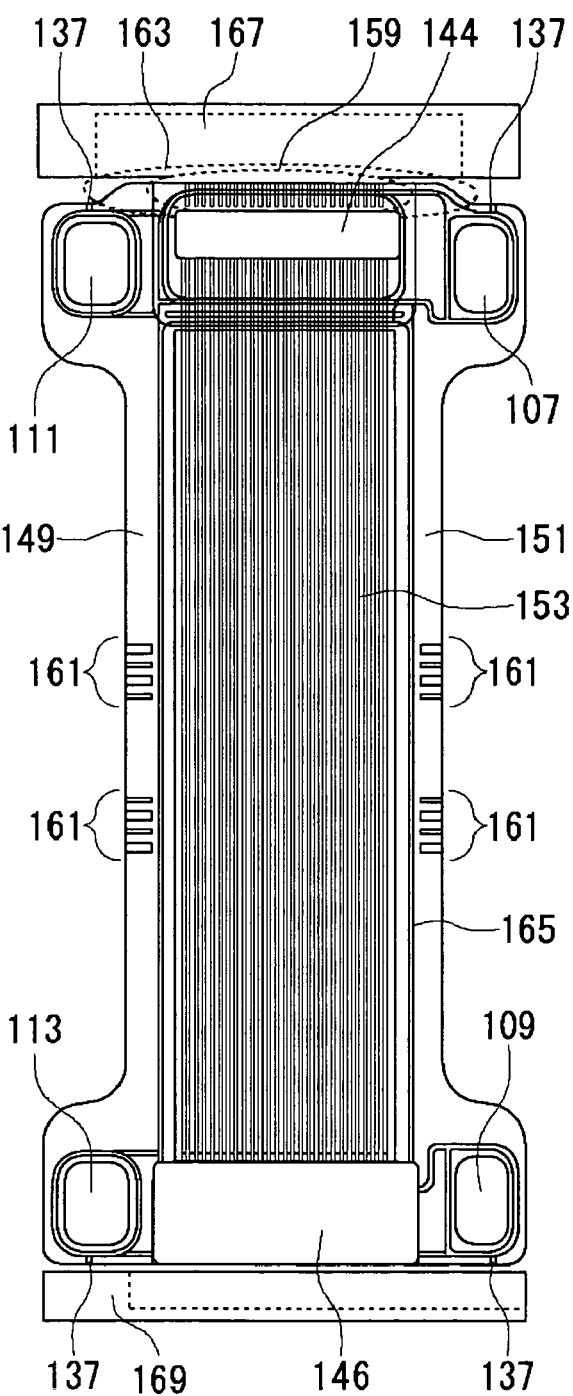
147

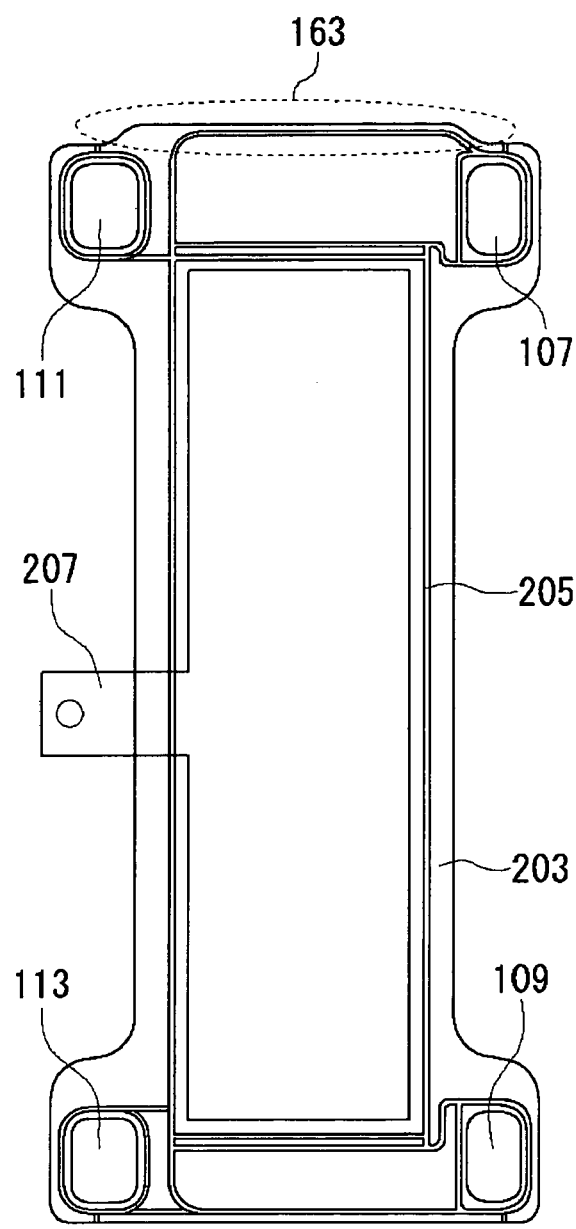
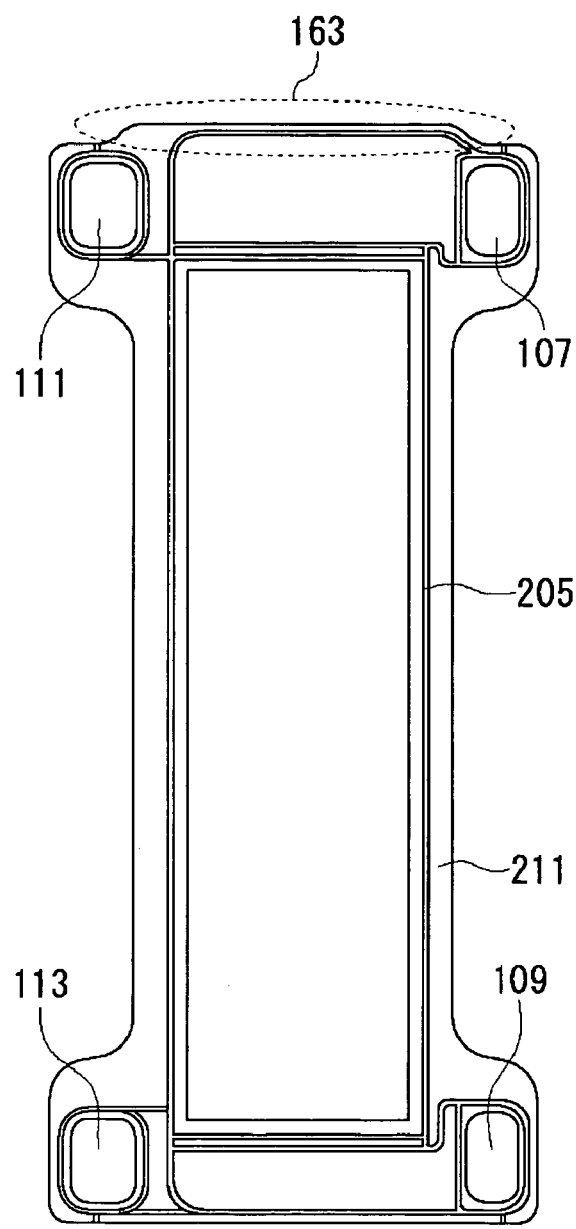

PRIOR ART

PRIOR ART

SEPARATOR FOR FUEL CELL AND FUEL CELL THEREWITH

BACKGROUND OF THE INVENTION

1. Field of the Invention

This invention relates to a separator for a fuel cell and a fuel cell therewith.

2. Description of the Related Art

Recently, there has been substantial interest in a fuel cell which shows a higher energy conversion efficiency and generates no harmful materials from a power-generating reaction. A known example of such a fuel cell is a polymer electrolyte fuel cell which can operate at a low temperature of 100° C. or lower.

A polymer electrolyte fuel cell is an apparatus having a basic structure in which a solid polymer membrane as an electrolyte membrane is disposed between a fuel electrode and an air electrode, and generates electric power while feeding a fuel gas containing hydrogen to the fuel electrode and an oxidizer gas containing oxygen to the air electrode, according to the following electrochemical reactions.

$$\text{Fuel electrode:} H_2 \rightarrow 2H^+ + 2e^- \quad (1)$$

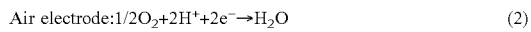

$$\text{Air electrode:} 1/2O_2 + 2H^+ + 2e^- \rightarrow H_2O \quad (2)$$

In the polymer electrolyte fuel cell, hydrogen ions can be conducted when the solid polymer electrolyte membrane is in a wet condition. The fuel and the oxidizer gases (hereinafter, sometimes referred to as "reaction gas" or "reaction fluid") are, therefore, generally fed after being humidified.

In a fuel electrode, hydrogen contained in a fuel fed is decomposed into hydrogen ions and electrons as shown in equation (1). The hydrogen ions move toward the air electrode through the solid polymer electrolyte membrane while the electrons move to the air electrode via an external circuit. On the other hand, in the air electrode, oxygen contained in an oxidizer fed to the air electrode reacts with the hydrogen ions and the electrons from the fuel electrode to form water as shown in equation (2). Thus, in the external circuit, electrons move from the fuel electrode to the air electrode so that electric power can be collected.

Outside of the fuel electrode and the air electrode, separators are provided. An anode is disposed on one surface of the solid polymer electrolyte membrane while a cathode is disposed on the other surface to form a membrane electrode assembly (MEA). The membrane electrode assembly is sandwiched between the gas separators to provide a cell unit. A plurality of the cell units are laminated and clamped as an integral part using a penetrating rod in a lamination direction, to form a cell stack. The separator in the side of the fuel electrode has a fuel gas channel for feeding a fuel gas to the fuel electrode. Similarly, the separator in the side of the air electrode has an oxidizer gas channel for feeding an oxidizer to the air electrode. Furthermore, between these separators, there is a cooling water channel for cooling the cell unit.

As described above, insufficient wetting of the solid polymer electrode membrane may cause inadequate electrochemical reaction, leading to deteriorated power-generation performance. Thus, in the prior art, a reaction gas is humidified and then fed to a gas separator such that the humidified reaction gas flowing in the channel keeps the solid polymer electrode membrane wet.

For making a fuel cell popular for household applications, it must be small and light as well as exhibit improved output properties and safety. Thus, there have been also investigated a separator for a fuel cell for making it smaller and lighter and for excellent properties (see, for example, Japanese Laid-open Patent Publication Nos. 2001-43868 and 2000-294261).

The separator described in Japanese Laid-open Patent Publication No. 2001-43868 does not have a configuration suitable for discharging water generated by the reaction represented by equation (2) and condensation of the wet reaction gas in the fuel cell. Water deposited in the channel for the reaction gas inhibits smooth flowing of the reaction gas. It may lead to insufficient feeding of the reaction gas to an electrode and resultantly unstable operation of the fuel cell. The technique described in Japanese Laid-open Patent Publication No. 2000-294261 is not satisfactory for achieving a compact fuel cell exhibiting improved output properties. In particular, a reaction gas is generally humidified by a humidifier before introduction into the system, and the gas is cooled in a manifold for feeding the reaction gas, generating a large amount of condensed water. When the condensed water is deposited on an inlet for a reaction gas in a separator or enters a reaction gas channel from the inlet for a reaction gas, the reaction gas channel is obstructed. It may inhibit even feeding of the reaction gas to the electrode surface, leading to reduction in a fuel cell output.

The phenomenon will be separately described in the sides of a cathode and an anode. When a wet reaction gas flows in the channel in the gas separator, water generates by an electrode reaction in the cathode side, so that as an oxidizer gas flows in the channel downstream, a water vapor concentration increases, leading to formation of condensed water, which is deposited on the channel. On the other hand, in the anode side, hydrogen is consumed by an electrode reaction, resulting in reduction of the volume of the fuel gas and increase in a water vapor concentration due to back-diffusion of water from the cathode side, and finally as in the cathode side, condensed water is deposited on the channel. In the channel with condensed-water deposition, a channel resistance for the reaction gas is higher than a channel without water deposition, distribution in a reaction gas flow rate may be observed among a plurality of channels in the gas separator, and/or sometimes distribution in a reaction gas flow rate may be observed among cell units constituting a cell stack, compared with a channel without water deposition. In such a case, feeding of the reaction gas may be insufficient, leading to deteriorated power-generation properties in a channel or cell unit to which a flow rate of the reaction gas is inadequate.

To solve the above problems, the number, the size (cross-sectional area) or the pattern of channels are varied to prevent condensed water from being deposited on the channel in the prior art. For example, there has been disclosed a technique that a width and a depth of a channel groove are selected to preventing retention of condensed water in the channel (Japanese Laid-open Patent Publication No. 1994-96777). Alternatively, Japanese Laid-open Patent Publication Nos. 2000-149966 and 2001-307753 have disclosed a conventional technique for draining water.

The solid polymer membrane itself is strongly acidic, the atmosphere in an operating fuel cell is strongly acidic. During long-term operation of the fuel cell under such strongly acidic conditions, corrosion resistance is sometimes inadequate even when a gas separator is coated with silver having a smaller ionization tendency. When the surface of the gas separator is eroded, ions of constituting metals in the gas separator are eluted. Thus, when metal ions (silver ions or metal ions constituting a substrate in a gas separator coated with silver) are eluted from the gas separator and then the ions penetrate into a polymer electrode membrane even in a trace amount, the metal ions are attracted to an ion-exchange group (sulfonic group) in the electrolyte membrane, leading to loss of proton conductivity in the solid polymer electrode membrane, which is undesirable for maintaining fuel cell performance. There has been, therefore, needed a gas separator for a fuel cell exhibiting improved corrosion resistance.

Furthermore, in a conventional fuel cell, a separator constituting a unit cell is characterized in that there are provided a plurality of continuous grooves to be channels for a reaction gas in which the periphery is flat and the central part is different between the front and the rear faces; the ends of the grooves are inclined; the peripheral flat area is sealed by a seal member; and the separator is made of stainless steel or titanium, and gas channels are provided within a substantially square area in the separator (see, for example, Japanese Laid-open Patent Publication No. 2002-25586, page 1, FIG. 1).

As illustrated in FIG. 24 (cited from FIG. 2 in WO 00/39872), there has been disclosed a fuel cell with a cylindrical protrusion at the center of a flat region wherein around the protrusion, a plurality of parallel cell operation parts 320a comprising a substantially square separator equipped with an inlet and an outlet for a fuel gas, an inlet and an outlet for an oxidizer gas and an inlet and an outlet for cooling water are tightly fastened as an assembly, via a pair of a right and a left collector plates 321a, 321b made of a conductive material such as stainless steel and a pair of a right and a left supporting plates 322 made of an insulating synthetic resin such as polypropylene, with a plurality of fixing bolts (see, for example, WO 00/39872, pp. 9-13, FIG. 2).

Related Art List

Japanese Laid-open Patent Publication No. 2001-43868,
Japanese Laid-open Patent Publication No. 2000-294261,
Japanese Laid-open Patent Publication No. 1994-96777,
Japanese Laid-open Patent Publication No. 2000-149966,
Japanese Laid-open Patent Publication No. 2001-307753,
Japanese Laid-open Patent Publication No. 2002-25586, and
WO 00/39872

A conventional separator for a fuel cell is not satisfactory for achieving a small and light fuel cell exhibiting improved output properties.

In the conventional separator constituting the cell for a fuel cell described in Japanese Laid-open Patent Publication No. 2002-25586, gas channels are provided within the substantially square region. Thus, the number of the gas channels are increased and a substantial amount of gas fed is divided into many channels so that a flow rate for each channel is reduced. As a result, a reaction efficiency of the gas per a given time period is reduced and further, water generated in an air electrode is deposited in the channels. Finally, gas flow is obstructed, leading to reduction in a power-generation efficiency.

In the fuel cell described in WO 00/39872, a cell operation part comprises substantially square-shaped separators as a component, so that the cell operation part is also a rectangular parallelepiped. Therefore, the plurality of fixing bolts for fastening and collector plates for collecting electricity generated from the cell operation part are placed outside of the cell operation part. Thus, a fuel cell requires the cell operation part for generating electric power, but the fuel cell becomes larger than the cell operation part due to the fixing bolts and the collector plates.

Furthermore, it is not necessarily adequate to prevent deposition of condensed water in the channel in the gas separator according to Japanese Laid-open Patent Publication No. 1994-96777. In particular, many droplets are generated in the downstream of the channel because water generated by an electrochemical reaction enters the channel. As shown in FIG. 31, in a gas separator 401 in which at the outlets of channels 402, there is provided a concave header 403 at which the plurality of channels 402 are joined, water droplets generated in the downstream of the channels 402 is gradually discharged by the reaction gas and deposited, resulting in a large amount of retained water 404 in the header 403. A large amount of the retained water 404 in the header 403 inhibits discharge of the reaction gas (unreacted reaction gas) to a manifold 405 following the header 403. As a result, the reaction gas cannot smoothly flow in the channel 402, and further, distribution of the reaction gas becomes uneven, leading to deteriorated power-generation performance.

In view of the circumstances, an objective of this invention is to provide a separator for a fuel cell where a fuel, oxidizer and/or coolant are evenly and effectively fed. Another objective of this invention is to a separator for a fuel cell where condensed water in a fuel or air can be effectively removed from a unit cell in the fuel cell. Another objective of this invention is to provide a separator for a fuel cell with good corrosion resistance. Another objective of this invention is to provide a separator for a fuel cell exhibiting excellent output properties and stability. Another objective of this invention is to provide a fuel cell and a separator for a fuel cell where condensed water derived from a reaction fluid can be effectively discharged from a fuel cell. Another objective of this invention is to provide a fuel cell and a separator for a fuel cell whereby a higher output can be stably obtained.

Another objective of this invention is to provide a fuel cell and a separator for a fuel cell which are small and light and have an improved power-generation efficiency.

Another objective of this invention is to provide a polymer electrolyte fuel cell adapted to prevent a large amount of retained water from generating within a header provided at the outlet of the separator.

SUMMARY OF THE INVENTION

This invention provides a separator for a fuel cell which functions as a separating wall between unit cells constituting the fuel cell stack and has a plurality of apertures forming channels for feeding a fuel, oxidizer or coolant in the direction of stacking the fuel cells, comprising a feeding manifold communicated with any of the plurality of apertures, and a plurality of channels communicated with the feeding manifold and extending in substantially parallel each other. A plurality of channels, for example three channels are substantially parallel.

The separator for a fuel cell according to this invention comprises the plurality of apertures forming channels for feeding a fuel, oxidizer or coolant in the direction of stacking the fuel cells, and a feeding manifold communicated with the apertures. These channels for the reaction fluid and the coolant are formed substantially parallel. Thus, a fuel, oxidizer or coolant can be effectively fed through the apertures and the feeding manifold in a limited space. Furthermore, it is hard to generate a deformation or a distortion in the separator in forming it.

In the separator for a fuel cell according to this invention, the feeding manifold may be formed over the whole surface of the end of the channels. Thus, the ends of the channels formed in parallel can be directly communicated with the feeding manifold. A fuel, oxidizer or coolant can be, therefore, more effectively fed to the channels.

The separator for a fuel cell according to this invention may comprise a cover plate covering the upper surface of the feeding manifold such that a distance between the bottoms of the cover plate and of the feeding manifold is substantially equal to the depth of the channels. Thus, the upper part of the feeding manifold is covered by the flat cover plate. Therefore, when stacking with a catalyst electrode-solid polymer electrode membrane composite to form a fuel cell stack, the surface of the separator sandwiching the catalyst electrode-solid polymer electrode membrane composite becomes flat, resulting in stable production of a fuel cell stack and an improved yield.

This invention also provides a separator for a fuel cell which functions as a separating wall between unit cells constituting the fuel cell stack and has a plurality of apertures forming channels for feeding a fuel, oxidizer or coolant in the direction of stacking the fuel cells, comprising a feeding manifold communicated with any of the plurality of apertures; a plurality of channels communicated with the feeding manifold and extending in substantially parallel with the feeding manifold; and a discharge manifold communicated with any of the apertures not communicated with the feeding manifold and with the channels.

The separator for a fuel cell according to this invention comprises, in addition to the feeding manifold, the discharge manifold. Therefore, a fuel, oxidizer or coolant passing through the channels can be effectively discharged from the discharge manifold through the apertures to the outside of the cell.

The separator for a fuel cell according to this invention may comprises cover plates covering the upper surfaces of the feeding and the discharge manifolds, where the cover plates are made of different materials for the feeding and the discharge manifolds.

Thus, the upper parts of the feeding and the discharge manifolds are covered by the flat cover plates. Therefore, when stacking with a catalyst electrode-solid polymer electrode membrane composite to form a fuel cell stack, the surface of the separator sandwiching the catalyst electrode-solid polymer electrode membrane composite becomes flatter, resulting in stable production of a fuel cell stack and a further improved yield. The cover plates made of different materials are used for the upper parts of the feeding and the discharge manifolds, so that excellent properties of the fuel cell can be ensured while reducing a production cost because a highly corrosion-resistant cover plate can be used for the upper part of the feeding manifold while a suitably corrosion-resistant cover plate can be used for the upper part of the discharge manifold.

The surface of the separator for a fuel cell according to this invention can be covered with a sealer such as a gas sealer. Thus, when forming a fuel cell stack, adhesiveness between adjacent separators can be improved. Therefore, leakage of a fuel, oxidizer or coolant between the separators can be prevented and the fuel cell can consistently provide a higher output.

In the separator for a fuel cell according to this invention, the feeding manifold may comprise a channel-resistance regulating member. A channel-resistance regulating member as used herein refers to a member which regulates a pressure loss during introducing a fuel, oxidizer or coolant from the feeding manifold to the channels. Thus, a resistance can be generated in the upstream of the channels in the fuel cell and can be reliably regulated. Therefore, a fuel, oxidizer or coolant is evenly distributed so that it can be more efficiently introduced into the channels. Furthermore, a resistance can be regulated so that water generated in the channels can be reliably discharged from the channels. For example, the channel-resistance regulating member may have a configuration that a nozzle having a smaller aperture area than the cross-sectional area of the channel is inserted in each channel.

This invention also provides a fuel cell wherein a plurality of cells for a fuel cell comprising electrodes and an electrolyte sandwiched between the electrodes are stacked via the separator for a fuel cell as described above.

In the fuel cell according to this invention, a fuel, oxidizer or water can be efficiently fed and discharged and further water generated in a channel can be efficiently discharged to the outside of the fuel cell because the separator for a fuel cell described above is used. Furthermore, the separator for a fuel cell is the highly corrosion-resistant cover plate so that a higher output can be consistently provided.

The fuel cell according to this invention may have a configuration that the channels in the separator for a fuel cell are vertically aligned; the feeding manifold is formed in the upper part of the channels; and the discharge manifold is formed in the lower part of the channels. Thus, a reaction fluid or coolant can be conveniently flown upward or downward while the fuel cell stands upright.

The fuel cell according to this invention may comprise a connecting channel inclined upward from the aperture connected with the feeding manifold to the feeding manifold in the upper part of the fuel cell. Thus, during introducing a fuel or oxidizer from the apertures to the feeding manifold, only gases can be reliably and efficiently introduced into the feeding manifold even when condensed water is generated in the apertures.

The fuel cell according to this invention may comprise a connecting channel inclined downward from the aperture connected with the discharge manifold to the feeding manifold in the upper part of the fuel cell. Thus, during discharging a fuel or oxidizer from the discharge manifold to the apertures, condensed water generated in the discharge manifold can be reliably discharged to be removed.

This invention also provides a fuel cell comprising a fuel cell stack in which a plurality of cells for a fuel cell comprising electrodes and an electrolyte sandwiched between the electrodes are stacked via separators for a fuel cell, and an external manifold placed on a surface in the upper part of the fuel cell stack, wherein a reaction fluid inlet in the fuel cell stack is placed above the contact surface between the surface in the upper part of the fuel cell stack and the external manifold.

In a manifold for feeding a reaction fluid, the reaction fluid with a high dew point introduced from a humidifier is cooled by heat release to generate a large amount of condensed water. When the condensed water moves down along the manifold wall and then directly enter the reaction fluid inlet, the channel for a reaction fluid is obstructed by the water, so that fluid flow is inhibited, leading to deterioration in output properties. In the fuel cell according to this invention, since the contact surface with the external manifold is below the reaction fluid inlet, condensed water moves down to the contact surface below the reaction fluid inlet. Thus, deposition of condensed water in the reaction fluid inlet is prevented, so that the reaction fluid can be reliably fed.

In the fuel cell according to this invention, the surface above the fuel cell stack may have a width larger than that of the contact surface, and a condensed-water collection area may be provided between the reaction fluid inlet and the contact surface. Thus, condensed water moves down along the external manifold wall into the condensed water collection area. It can, therefore, further prevent deposition of condensed water in the reaction fluid inlet.

In the fuel cell according to this invention, the external manifold may have a drain, above which the reaction fluid inlet of the fuel cell stack is placed. Thus, condensed water collected in the condensed water collection area is discharged from the drain, so that condensed water can be further reliably prevented from directly entering from the reaction fluid inlet into the reaction fluid channel, resulting in stabilization of cell output properties.

In the fuel cell according to this invention, the cross section perpendicular to the stacking direction of the fuel cell stack may be substantially H-shaped. Thus, a fuel, oxidizer or coolant can be efficiently fed using four protrusions. Therefore, a longitudinal length of the fuel cell can be reduced, resulting in downsizing of the cell.

In the fuel cell according to this invention, a sealer may be used for ensuring tightness between the surface above the fuel cell stack and the external manifold. Such a configuration can prevent leakage of the reaction fluid or water from a gap between the external manifold and the fuel cell stack. Thus, a reaction fluid can be further efficiently fed and also safety of the fuel cell can be improved.

This invention also provides a separator for a fuel cell comprising a substrate; a rectangular channel-forming area in the substrate surface; a plurality of parallel channels formed along the longitudinal direction of the channel-forming area; and a reaction fluid feed port for feeding a reaction fluid in an external manifold, wherein the separator for a fuel cell is H-shaped.

Since the separator for a fuel cell according to this invention is H-shaped, a fuel, oxidizer or coolant can be efficiently fed using four protrusions. Furthermore, the feeding manifold may be formed such that it covers the whole surface of the channel ends. Thus, a fuel, oxidizer or coolant can be fed from three directions in the feeding manifold not communicated with the channels, respectively. Furthermore, either of the oxidizer or the fuel feed port can be formed along the longitudinal direction of the feeding manifold, so that these reaction fluids can be fed from the whole surface of the channel ends. Thus, the reaction fluid can be evenly fed into the channel-forming area and condensed water generated in the channels can be efficiently removed.

This invention also provides a separator for a fuel cell comprising a substrate; a rectangular channel-forming area in the substrate surface; a plurality of parallel channels formed along the longitudinal direction of the channel-forming area; and a reaction fluid feed port for feeding a reaction fluid in an external manifold, wherein the reaction fluid feed port is formed at the end of the substrate such that the port protrudes along the longitudinal direction of the substrate.

In the separator for a fuel cell according to this invention, the reaction fluid feed port is formed at the end of the substrate and protrudes along the longitudinal direction of the substrate. Thus, when forming a stack by stacking the separators for a fuel cell, a reaction fluid can be fed downward through the vertically aligned channels, while preventing deposition of condensed water in the reaction fluid inlet. The separator can be, therefore, suitably used in a fuel cell.

In the separator for a fuel cell according to this invention, the substrate surface may comprise a bead for preventing a reaction fluid fed from the reaction fluid feed port from leaking to the outside of the channel. Thus, when forming a stack by stacking the separators for a fuel cell and the external manifold is formed in the upper part of the stack, leakage of the reaction fluid or water from a gap between the external manifold and the fuel cell stack can be prevented. The reaction fluid can be, therefore, further efficiently fed and safety of the fuel cell can be improved.

This invention also provides a separator for a fuel cell comprising a plurality of reaction fluid channels in parallel. These channels are within a rectangular area whose longitudinal direction is along the line connecting both ends of the channel, wherein there is a notch extending to the inside along the width direction at the center of the longitudinal length in a peripheral area of the rectangular area.

This invention also provides the fuel cell comprising, in the notch, a tie rod for combining and fastening a stack of the unit cells comprising the separators for a fuel cell as a component with tie plates placed on both outermost surfaces of the stack for applying a compressive load in the stacking direction of the stack to fix the stack. Furthermore, the notch may comprise a collector plate for collecting electric power generated in the stack. Furthermore, the notch may comprise a voltage measuring terminal for the unit cell in the stack. Furthermore, a rectangular heat insulating material may be provided, covering the notch and the whole periphery of the stack.

This invention also provides a polymer electrolyte fuel cell comprising a separator having a plurality of channels through which an oxidizer and a fuel flow in the cathode and the anode sides, respectively and at the outlets of the channels, a concave header in which the channels are joined, where the reaction fluids from the channel are joined in the header and then enter a duct communicated with the outlet of the header and penetrating the cell in the stacking direction, wherein the apertures of the oxidizer channels or the fuel channels to the header have an opening area smaller than that in any of the other channel parts.

This invent ion also provides a polymer electrolyte fuel cell comprising a separator having a plurality of channels through which an oxidizer and a fuel flow in the cathode and the anode sides, respectively and at the outlets of the channels, a concave header in which the channels are joined, where the reaction fluids from the channel are joined in the header and then enter a duct communicated with the outlet of the header and penetrating the cell in the stacking direction, wherein the header has a depth larger than that of the channels.

This invention also provides a polymer electrolyte fuel cell comprising a separator having a plurality of channels through which an oxidizer and a fuel flow in the cathode and the anode sides, respectively and at the outlets of the channels, a concave header in which the channels are joined, where the reaction fluids from the channel are joined in the header and then enter a duct communicated with the outlet of the header and penetrating the cell in the stacking direction, wherein the inner wall of the header is hydrophobic.

This invention also provides a polymer electrolyte fuel cell comprising a separator having a plurality of channels through which an oxidizer and a fuel flow in the cathode and the anode sides, respectively and at the outlets of the channels, a concave header in which the channels are joined, where the reaction fluids from the channel are joined in the header and then enter a duct communicated with the outlet of the header and penetrating the cell in the stacking direction, wherein a water absorber connected to the manifold is provided within the header. The water absorber may be provided such that it is in contact with the ends of the fluid channels.

In the polymer electrolyte fuel cell, two or more of the above features of the polymer electrolyte fuel cell may be combined.

The above components would be appropriately combined and the expressions in the description of this invention would be replaced among the methods and the devices. Such variations would be within the range of this invention.

BRIEF DESCRIPTION OF THE DRAWINGS

FIG. 2A shows a surface, where fuel channels are formed, of a configuration of a separator in a fuel electrode side according to an embodiment of this invention and FIG. 2B shows a surface of the separator where cooling water channels are formed.

FIG. 15A shows a surface, where fuel channels are formed, of a configuration of a substrate in a separator for a fuel cell according to an embodiment of this invention and FIG. 15B shows a surface of the substrate where cooling water channels are formed.

FIG. 16A shows a surface, where fuel channels are formed, of a configuration of a separator according to an embodiment of this invention and FIG. 16B shows a surface of the separator where cooling water channels are formed.

FIG. 17A shows a surface of a substrate in a separator for a fuel cell according to an embodiment of this invention and FIG. 17B shows a surface of the substrate where air channels are formed.

FIG. 18A shows a surface of a separator in a air electrode side according to an embodiment of this invention and FIG. 18B shows another surface of the separator.

FIG. 19A shows a configuration of an insulator and FIG. 19B shows an end plate, according to an embodiment of this invention.

DETAILED DESCRIPTION OF THE INVENTION

Embodiment 1

Some preferred embodiments, including Embodiment 1, will be described in terms of a separator for a fuel cell comprising fuel channels, a separator for a fuel cell comprising air channels and a fuel cell where a plurality of substantially parallel channels are aligned. In the embodiments described below, a cooling water channel is provided on the rear surface of a fuel channel.

Figure 1A:
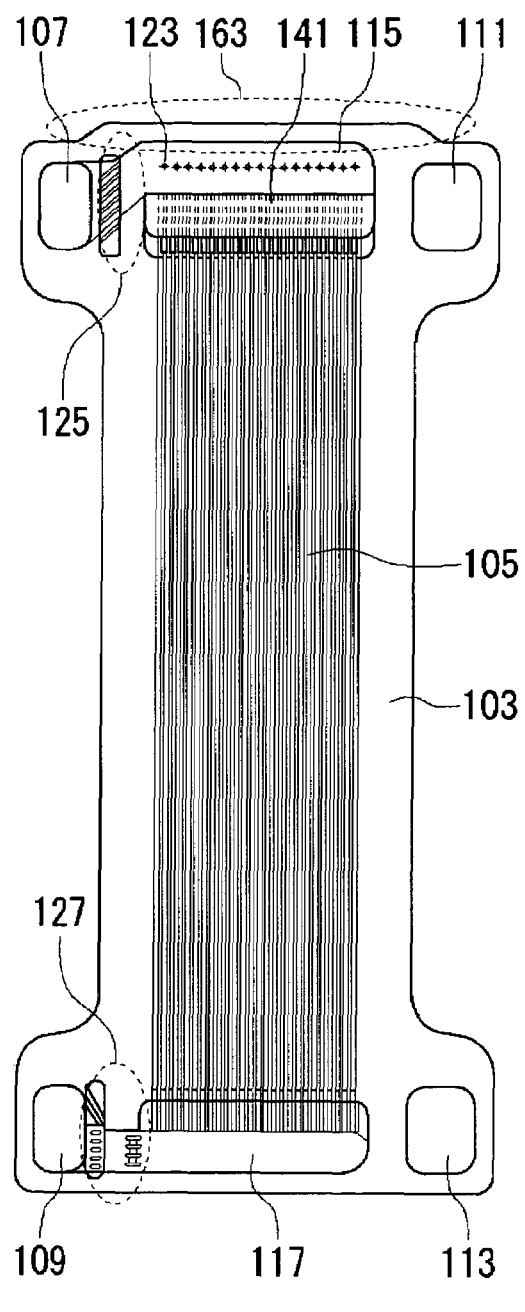
FIG. 1A shows a surface, where fuel channels are formed, of a configuration of a substrate in a separator for a fuel cell according to an embodiment of this invention
Figure 1B:
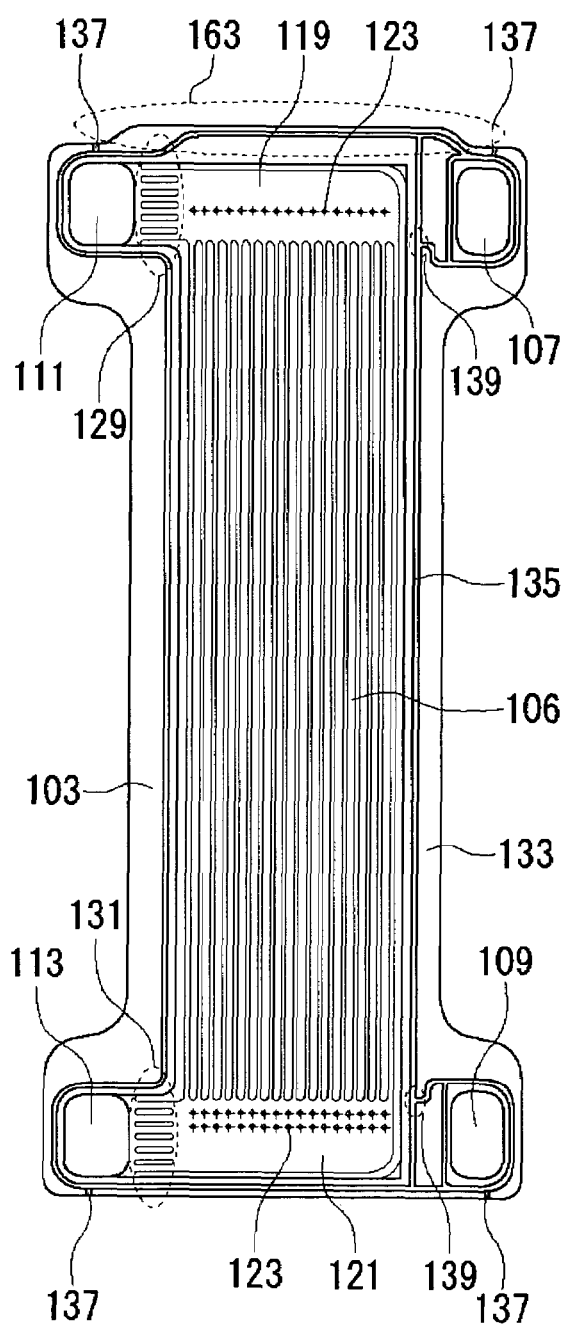
FIG. 1B shows a surface of the substrate where cooling water channels are formed.

This embodiment relates to a separator for a fuel cell comprising fuel channels in one surface and cooling water channels in the other surface. FIGS. 1A-1B show a configuration of a substrate 103 in a separator for a fuel cell according to this embodiment. The substrate 103 is H-shaped where the width direction is vertical, i.e., both ends in the longitudinal direction of the rectangle protrude to the width direction. In one surface of the substrate 103, fuel channels are formed as shown in FIG. 1A, while in the other surface, cooling water channels are formed as shown in FIG. 1B. These surfaces will be individually described in detail.

FIG. 1A shows the surface of the substrate 103 where fuel channels are formed. A fuel is fed from a first fuel-feeding manifold 107 through a fuel introducing channel 125 to a second fuel-feeding manifold 115, from which the fuel is then fed through a nozzle 141 to fuel channels 105. After passing through the fuel channels 105, the fuel flows through a second fuel-discharging manifold 117, then through a fuel-discharging channel 127, to a first fuel-discharging manifold 109, and is finally discharged to the outside of the substrate 103.

FIG. 1B shows the surface of the substrate 103 where cooling water channels are formed. Cooling water flows from a first cooling-water-feeding manifold 111, through a cooling water introducing channel 129, to a second cooling-water-feeding manifold 119, from which the cooling water is then fed to cooling water channels 106. After passing through the cooling water channels 106, the cooling water flows from a second cooling-water-discharging manifold 121, through a cooling-water-discharging channel 131, to a first cooling-water-discharging manifold 113, and is finally discharged to the outside of the substrate 103.

As shown in FIGS. 1A-1B, the second fuel-feeding manifold 115 and the second cooling-water-feeding manifold 119 are substantially rectangular, and in the substrate 103, the first manifolds for feeding and discharging a fuel and water are provided on the outside of the shorter edges of the second fuel-feeding manifold 115 and the second cooling-water-feeding manifold 119. On the outside of the longer edges, first manifolds for feeding and discharging air are formed as described later in Embodiment 3. The second fuel-feeding manifold 115, the second cooling-water-feeding manifold 119 and the second cooling-water-discharging manifold 121 comprise a protrusion 123.

A flow direction of a fuel gas or cooling water in the first manifold is perpendicular to that of the fuel gas or cooling water in the second manifold. Furthermore, a flow direction of a fuel gas or cooling water in the second manifold is also perpendicular to that in the fuel channels 105 or the cooling water channels 106. By providing the second manifold between the first manifold and the channels and setting the flow direction of the fuel gas or cooling water in such a manner, the fuel and cooling water can be efficiently fed in a limited space.

The fuel channels 105 or the cooling water channels 106 are aligned in parallel with the rectangular area. An edge ratio of the rectangular in which the fuel channels 105 or the cooling water channels 106 are formed may be, for example, about 1/1.5 to 1/6, preferably about 1/2 to 1/4 in shorter edge/longer edge. The reasons are as follows.

For efficient contribution of a fuel gas fed into the separator to a reaction within a limited separator size, it is preferable to reduce the number of the channels and increase a flow rate of the fuel gas flowing in the channels. Furthermore, a larger flow rate is preferable in the light of blowing out or discharging condensed water retained in the channels.

In terms of the edges of the rectangle where the channels are formed, if the edge along the longitudinal direction of the channels is too longer in relation to the edge along the width direction of the channels, a temperature distribution may tend to generate within the plane, leading to reduction in a reaction efficiency in the electrodes. It is, therefore, necessary to ensure channels having an appropriate flow rate and an appropriate area, taking these conditions into account.

In terms of cooling water, since the upstream of the fuel channels 105 is easy to be dry, cooling water is preferably fed from the upstream to the downstream in the fuel channels 105.

After our investigation in the light of these conditions, it has been found that the above edge ratio may provide a fuel cell exhibiting a higher power-generation efficiency.

In the cooling water channels, the smaller a cross-sectional area is, the higher a discharge efficiency for bubbles is, while the larger the area is, the smaller a resistance to water is. The fuel channel 105 may be, therefore, designed, in the light of these conditions in combination.

Figure 10A:
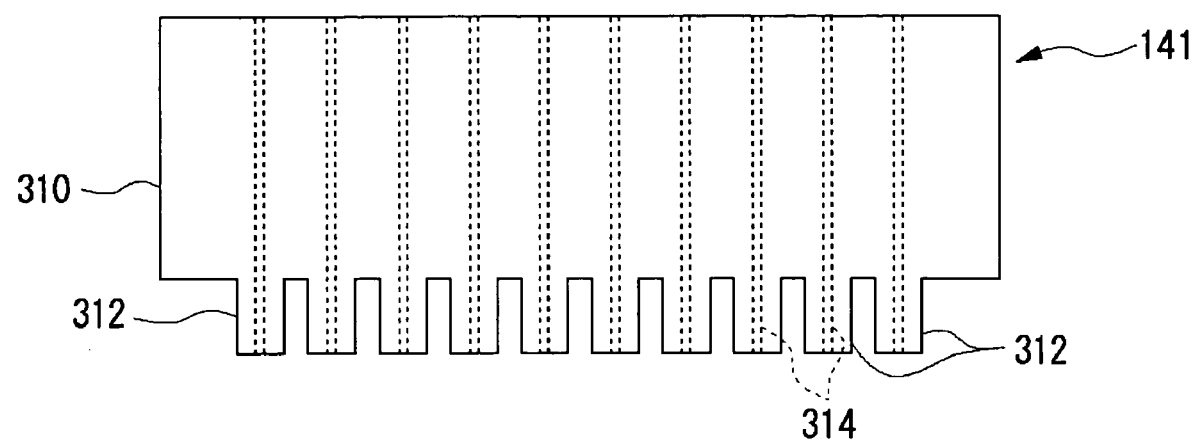
FIG. 10A shows a plan view of a configuration of a nozzle used in the separator for a fuel cell in FIG. 1
Figure 10B:
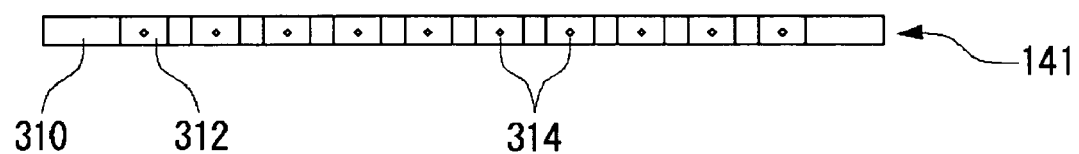
FIG. 10B shows a front view of it.

A nozzle 141 is provided between the second fuel-feeding manifold 115 and the fuel channels 105. The nozzle 141 generates resistance in the inlet area of the fuel channels 105. FIGS. 10A-10B show a configuration of the nozzle 141. FIGS. 10A and 10B are a plan view and a front view, respectively. The nozzle 141 has a thin plate base 310. In one end of the base 310, protruded pieces 312 are formed in parallel like comb teeth in at a certain interval. In the other end of the base 310, nozzle apertures 314 penetrating individual protruded pieces 312 are formed.

The nozzle 141 has a size such that it can be communicated with the second fuel-feeding manifold 115. Its thickness is selected such that when being placed in the second fuel-feeding manifold 115, the upper surface of the nozzle 141 is substantially at the level of the surface of the substrate 103. A nozzle aperture 314 is inserted in each fuel channel 105 such that the second fuel-feeding manifold 115 is communicated with the fuel channels 105 via the nozzle aperture 314. A diameter of the nozzle aperture 314 may be, for example, 0.25 mm in the inlet side, i.e., the side of the second fuel-feeding manifold 115. Thus, a pressure loss can be generated in the upstream of the fuel channels 105 to remove condensed water.

Since the channel shape is selected such that a pressure loss is equal among the channels, a fuel gas rate per a channel can be made uniform. Furthermore, water can be well controlled in the fuel channels 105 and dry-up of the solid polymer electrode membrane and occlusion of the channels due to a water droplet generated by condensation can be prevented. Therefore, an electrochemical reaction in an electrode can be stabilized and uniform, so that the satisfactory electrochemical reaction can proceed, resulting in an improved output of the fuel cell.

The nozzle 141 may be made of, for example, a resin. It is preferable to use a material exhibiting good fluidity during molding and higher finished dimensional accuracy and some flexibility. For example, the nozzle can be formed by integral molding using polyacetal, polymethylpentene, polyphenylene ether, polyphenylene sulfide and a liquid-crystal polymer.

FIG. 2 shows a separator 101 in the side of the fuel electrode, where a gold clad plate 143 and an SUS plate 145 are placed on a substrate 103. FIGS. 2A and 2B correspond to the surfaces in FIGS. 1A and 1B, respectively. As shown in FIG. 2A, the gold clad plate 143 is provided for the second fuel-feeding manifold 115 and the fuel introducing channel 125, while the SUS plate 145 for the second fuel-discharging manifold 117 and the fuel-discharging channel 127.

Thus, in the separator 101 in the fuel electrode side, the gold clad plate 143 is used in the fuel feeding side, i.e., in the upstream of the fuel channel 105 and the SUS plate 145 in the downstream of the fuel channel 105. By providing the gold clad plate 143 and the SUS plate 145, a surface which seals the solid polymer electrode membrane can be made flat when forming a stack described later. In other words, when forming a stack, the edge of the solid polymer electrode membrane constituting the cell is sealed and joined with the separator.

When the solid polymer electrode membrane is directly placed on the second manifold, it is joined with the stepped surface of the substrate 103. However, by providing the gold clad plate 143 or the SUS plate 145 and joining them with the surface, reliability of sealing can be improved. Furthermore, by using an expensive gold clad plate 143 in the upstream of the fuel channel 105, contamination of the solid polymer electrode membrane with metal ions can be prevented. In the downstream, an inexpensive SUS plate 145 can be used to reduce a cost. Thus, a fuel cell showing good output properties can be prepared with a low cost.

For the fuel introducing channel 125 communicating the fuel channels 105 with the first fuel-feeding manifold 107 and the second fuel-discharging manifold 117 and the fuel-discharging channel 127 communicating the second fuel-feeding manifold 115 or the fuel channel 105 with the first fuel-discharging manifold 109, it is preferable to form a step in the substrate 103 such that it is deeper than the fuel channels 105.

Figure 9:
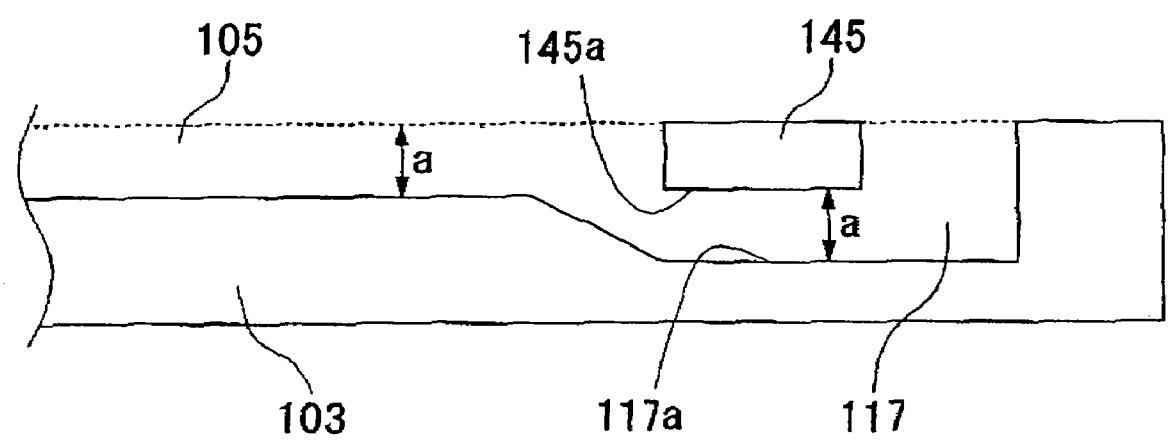
FIG. 9 illustrates a configuration of the separator for a fuel cell in FIG. 1.

The configuration will be described with reference to FIG. 9 in terms of the fuel discharge side. FIG. 9 illustrates a configuration of the separator for a fuel cell in FIG. 1. FIG. 9 shows a cross section of the substrate in the direction from the fuel channel 105 to the second fuel-discharging manifold 117. As shown in FIG. 9, since the SUS plate 145 is to be placed in the second fuel-discharging manifold 117, a step is formed in the channel such that a depth from the undersurface 145a of the SUS plate 145 to the bottom face 117a of the second fuel-discharging manifold 117 is equal to a depth ("a") of the fuel channels 105. Thus, the depth of the fuel channels in the second fuel-discharging manifold 117 can be substantially equal to the depth of the fuel channels 105, resulting in smooth feeding of the fuel gas. Such a configuration may be also employed in the fuel feeding side.

In FIGS. 1A and 2A, the fuel introducing channel 125 communicating the first fuel-feeding manifold 107 with the second fuel-feeding manifold 115 is not perpendicular but oblique to the longitudinal direction of the fuel channels 105. By such a configuration, retention of condensed water can be prevented in the fuel introducing channel 125 when a humidified fuel gas is fed from the first fuel-feeding manifold 107. On the contrary, in the fuel-discharging channel 127, condensed water contained in the fuel gas introduced into the fuel-discharging channel 127 from the fuel channels 105 can be more quickly and efficiently moved to the first fuel-discharging manifold 109 and then discharged to the outside of the cell.

As shown in FIGS. 1B and 2B, a sealer 133 is glued on the surface of the substrate 103 around the cooling water channels 106. The sealer 133 has a two-line bead 135. Forming the bead 135 can improve adhesiveness between adjacent substrates 103. Therefore, when forming a stack by stacking the separators according to this embodiment, adhesiveness to another separator is so good that leakage of gases or water can be suitably prevented. Examples of a sealer which can be used include EPDM (ethylene-propylene-dien rubber) and silicone rubbers.

In a corner where the direction of the bead 135 is changed, the corner is chamfered by R-processing, while in the protrusion crossover area 139, the beads 135 orthogonally cross in order to reinforce sealing by making the shape of the bead 135 identical to that of a bead 165 described later in Embodiment 2, without being R-processed. By employing such a configuration, the bead 135 around the cooling water channels 106 can be reinforced, resulting in more reliable adhesiveness between the separators.

There is an upper surface seal 137 in the upper part of the substrate 103. The upper surface seal 137 can prevent air or condensed water leaking through a gap between the separators 101 in the fuel electrode side, when the separators according to this embodiment are erected and stacked such that the protrusion 163 is upper.

Figure 11A:
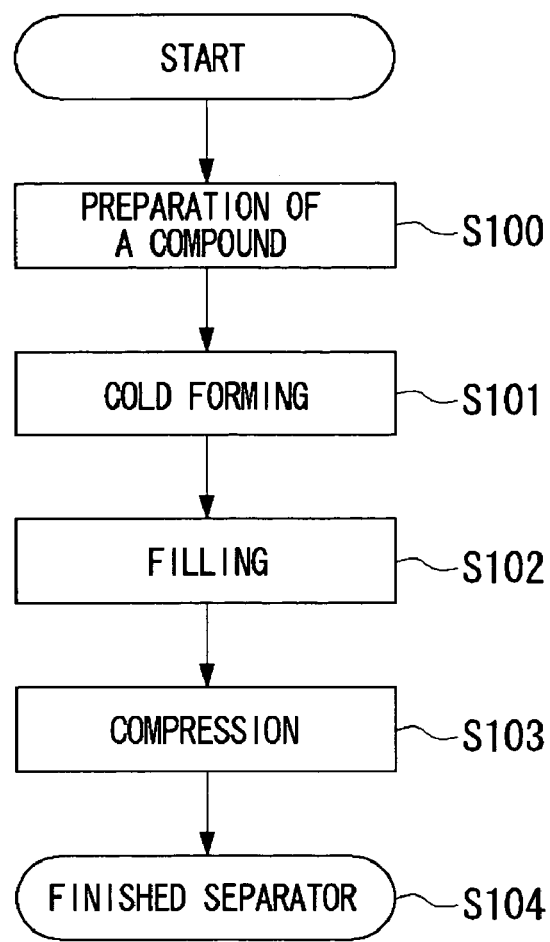
FIG. 11A illustrates a process for manufacturing a separator for a fuel cell according to an embodiment of this invention and FIG. 11B shows a situation of manufacturing.
Figure 11B:
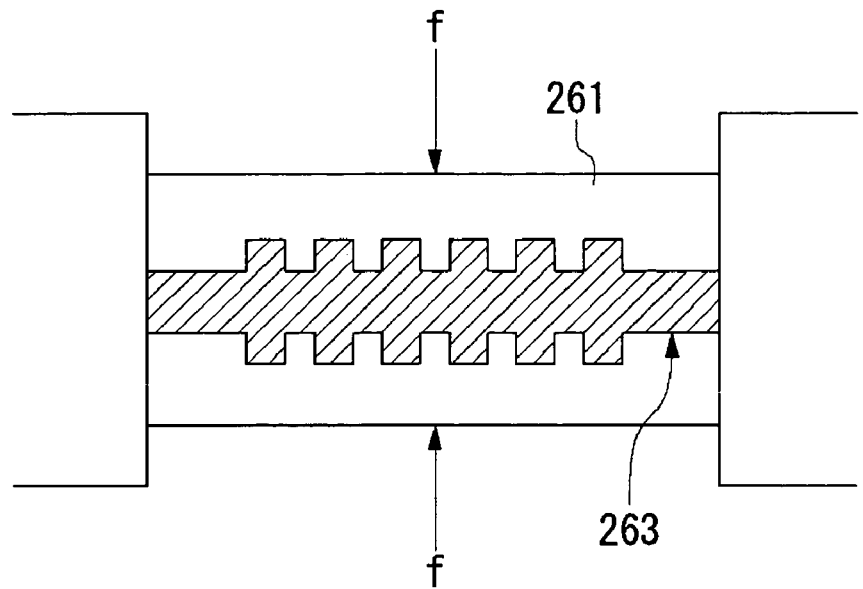

There will be described a process for preparing the substrate 103. FIGS. 11A-11B illustrate a process for manufacturing a separator for a fuel cell.

The substrate 103 may be prepared by molding a mixture of carbon powder and thermosetting resin powder. The resin powder may act as a binder to facilitate molding, and therefore, an inexpensive plate can be obtained. A compounding ratio of carbon powder and thermosetting resin powder may be, for example, about 6:4 to 19:1.

FIG. 11A illustrates the steps for preparing the substrate 103 and FIG. 11B illustrates situation. The "separator" in FIG. 11 corresponds to the substrate 103. As shown in FIG. 11A, graphite powder and a thermosetting resin are homogeneously mixed to prepare a desired compound (S100). A bearing within a range of 2 to 10 MPa is applied to the compound for preliminarily cold-forming the compound to a shape similar to the final molding shape (S101). Then, as shown in FIG. 11B, the preforming body is placed in a mold 261 having a given final shape (S102). Then, while heating a mold 261 to 150 to 170° C., a press (not shown) is operated. During the process, as shown in FIG. 11B, a bearing within a range of 10 to 100 MPa, preferably 20 to 50 MPa is applied in the direction of the arrow (S103), to give a separator 263 having a final shape corresponding to the mold 261 (S104).

In the separator 263 prepared as described above, the compound is pre-molded to a shape similar to the final shape, the preforming body is placed in the mold 261, and then as heating it to 150 to 170° C., a high molding bearing at 10 to 100 MPa (preferably, 20 to 50 MPa) is applied, during which as the thermosetting resin is melted, a thermosetting reaction can be initiated to uniformly form the separator 263 with a higher molding density and a desired shape.

Embodiment 2

Figure 3A:
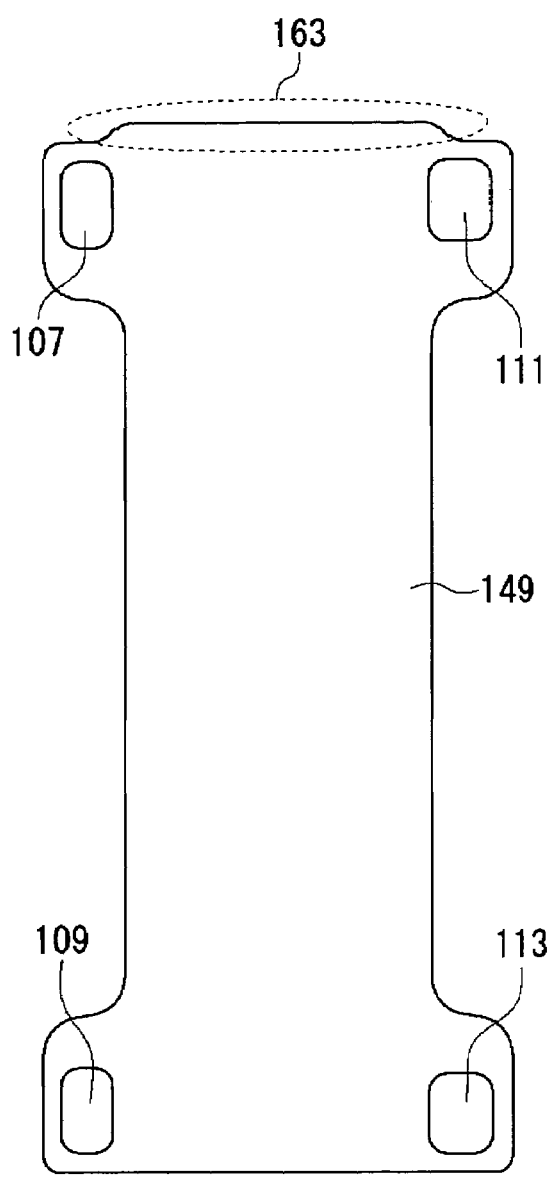
FIG. 3A shows a surface of a substrate in a separator for a fuel cell according to an embodiment of this invention and FIG. 3B shows a surface of the substrate where air channels are formed.
Figure 3B:
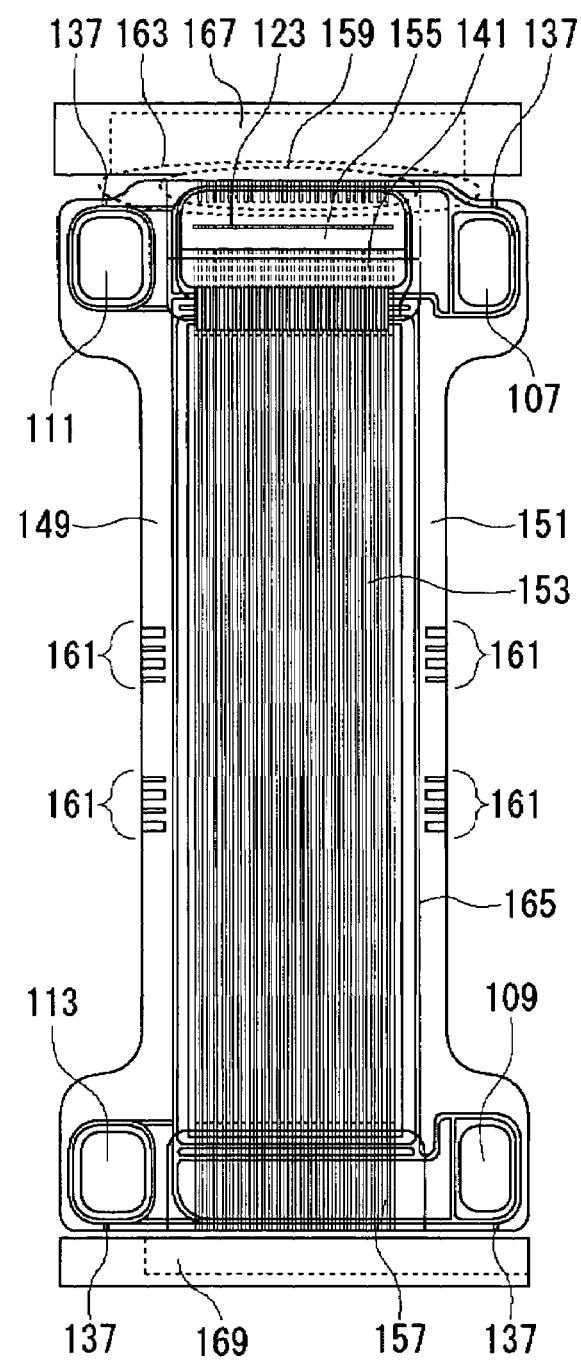

This embodiment relates to a separator for a fuel cell comprising air channels in one side. FIGS. 3A-3B show a configuration of a substrate 149 in a separator for a fuel cell according to this embodiment. The substrate 149 has the same shape as the substrate 103 in Embodiment 1. Therefore, the following description will be mainly related to elements different from those in the substrate 103. In one side of the substrate 149, air channels are formed as shown in FIG. 3B, while the other side is flat as shown in FIG. 3A.

The substrate 149 also comprises, as in Embodiment 1, a first fuel-feeding manifold 107, a first fuel-discharging manifold 109, a first cooling-water-feeding manifold 111 and a first cooling-water-discharging manifold 113, and channels for a fuel or cooling water are formed.

As shown in FIG. 3B, in the side comprising the air channels, air fed to the first air-feeding manifold 167 passes through an air introducing channel 159, then through a second air-feeding manifold 155, to air channels 153. Then, the air passing through the air channel 153 is fed from a second air-discharging manifold 157 to a first air-discharging manifold 169, and finally discharged to the outside of the substrate 149. The air channels 153 are formed as a rectangular region in a substantially center of the substrate 149.

Figure 4A:
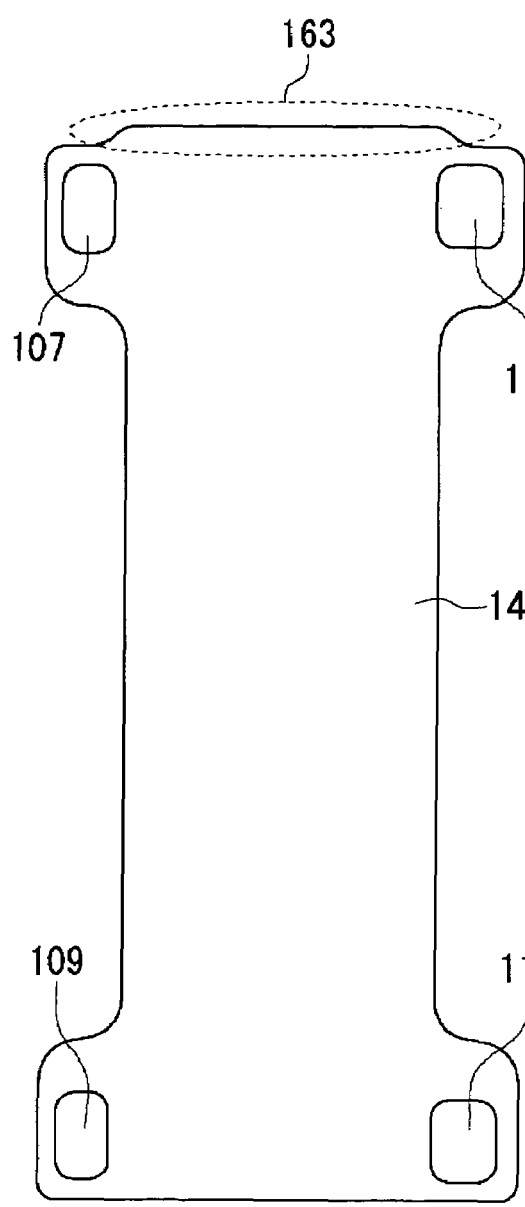
FIG. 4A shows a surface of a separator in a fuel electrode side according to an embodiment of this invention and FIG. 4B shows a surface of the separator where air channels are formed.
Figure 4B:
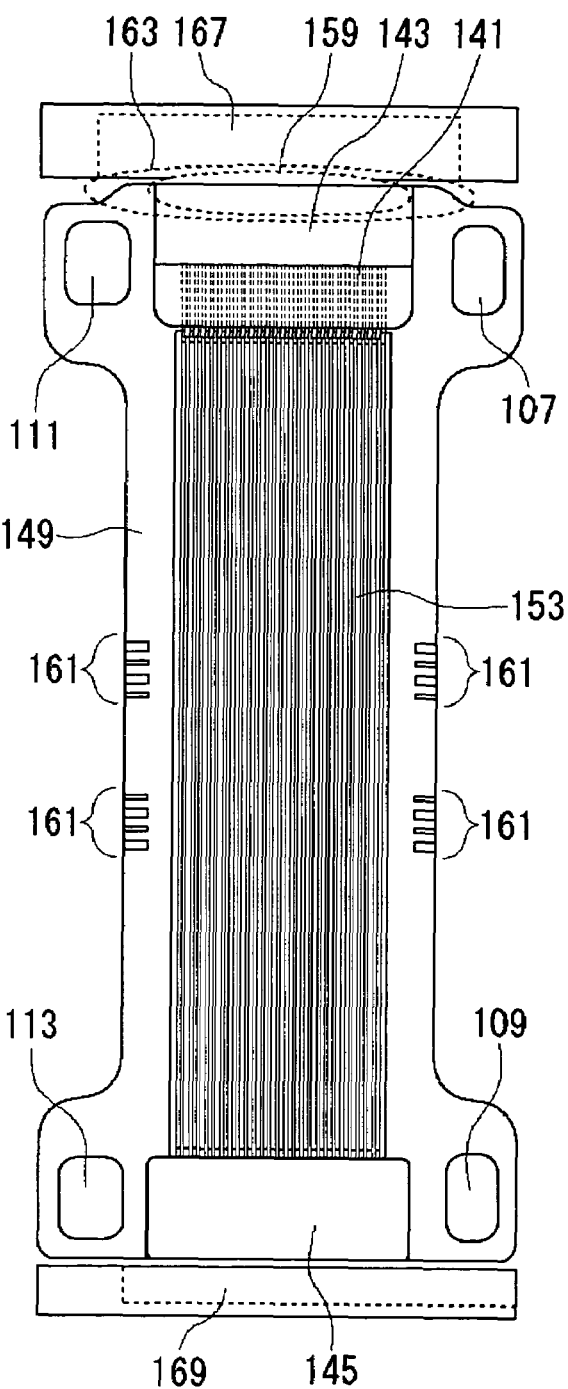

FIG. 4 shows a separator 147 in the side of the air electrode, where a gold clad plate 143 and an SUS plate 145 are placed on the substrate 149. FIGS. 4A and 4(b) correspond to the surfaces in FIGS. 3A and 3B, respectively. In FIG. 4B, a sealer 151 is not shown. The separator 147 in the side of the air electrode also comprises, as in the separator 101 in the side of the fuel electrode, the gold clad plate 143 in the upstream of the air channels 153 and the SUS plate 145 in the downstream, so that contamination of the air channels 153 by impurities can be minimized and a cost can be reduced.

Between the second air-feeding manifold 155 and the air channels 153, a nozzle 141 is placed to ensure a pressure for discharging condensed water in the air channels 153, so that air can be evenly fed to the air channels 153.

As in Embodiment 1, a step may be formed such that a depth of the second air-feeding manifold 155 is equal to a channel depth of the nozzle 141 or the air introducing channel 159, so that air can be more efficiently fed.

The separator 147 in the air electrode side also comprises a sealer 151 around the region in the substrate 149 where air channels 153 are formed, to ensure adhesiveness by a bead 165 when stacking the separator 147 in the air electrode side.

Furthermore, the separator 147 in the air electrode side comprises an insertion port for a voltage measuring terminal 161. Thus, a voltage measuring terminal may be inserted the insertion port for a voltage measuring terminal 161 to check an output between given cells.

The separator 147 in the air electrode side according to this embodiment can be prepared as described in Embodiment 1.

Embodiment 3

Figure 6A:
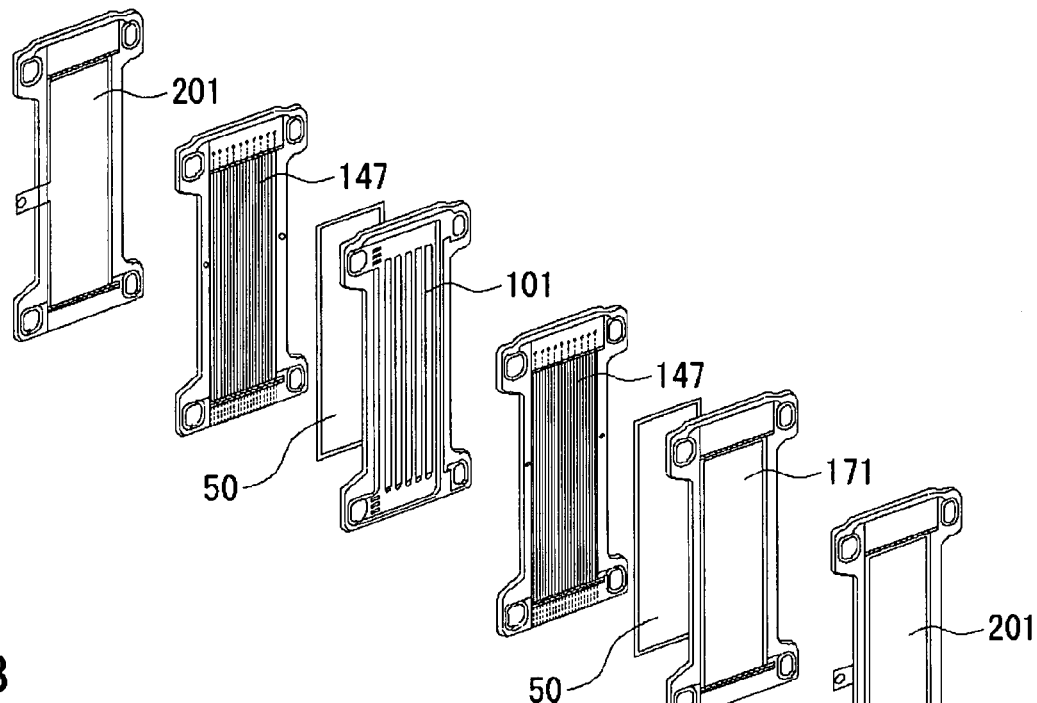
FIG. 6A is a perspective view showing a configuration of a cell stack and FIG. 6B shows a rear face of each plate.
Figure 6B:
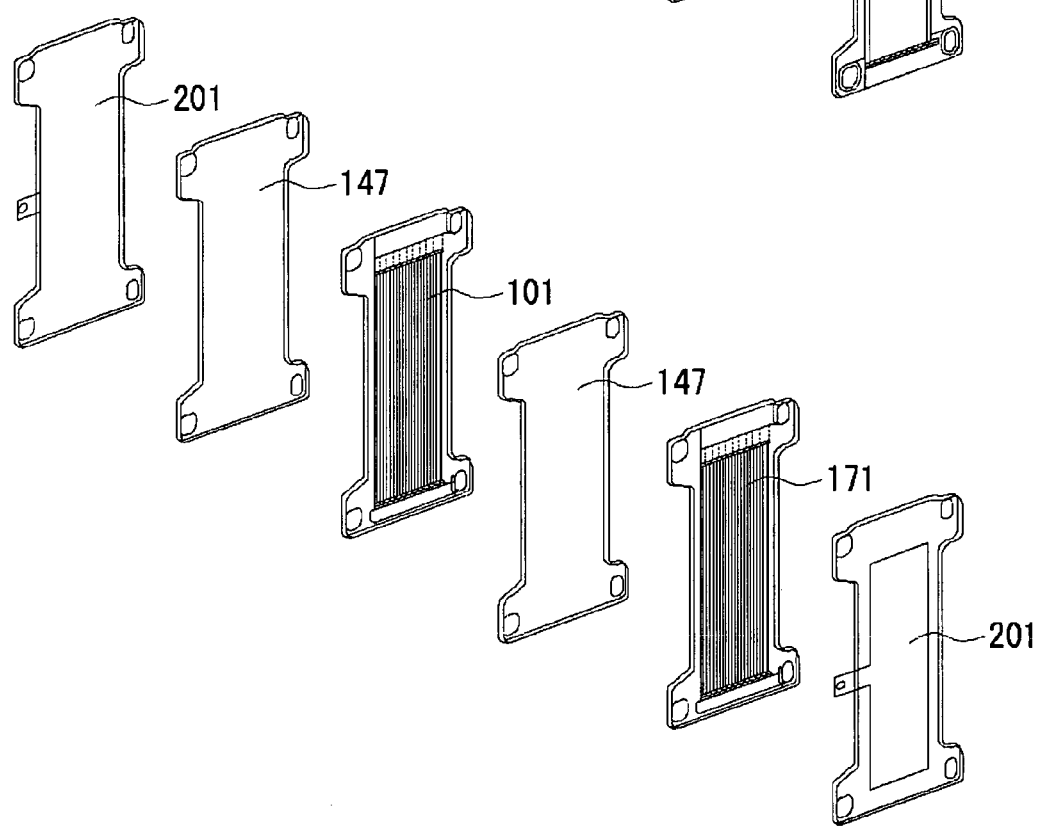
Figure 7:
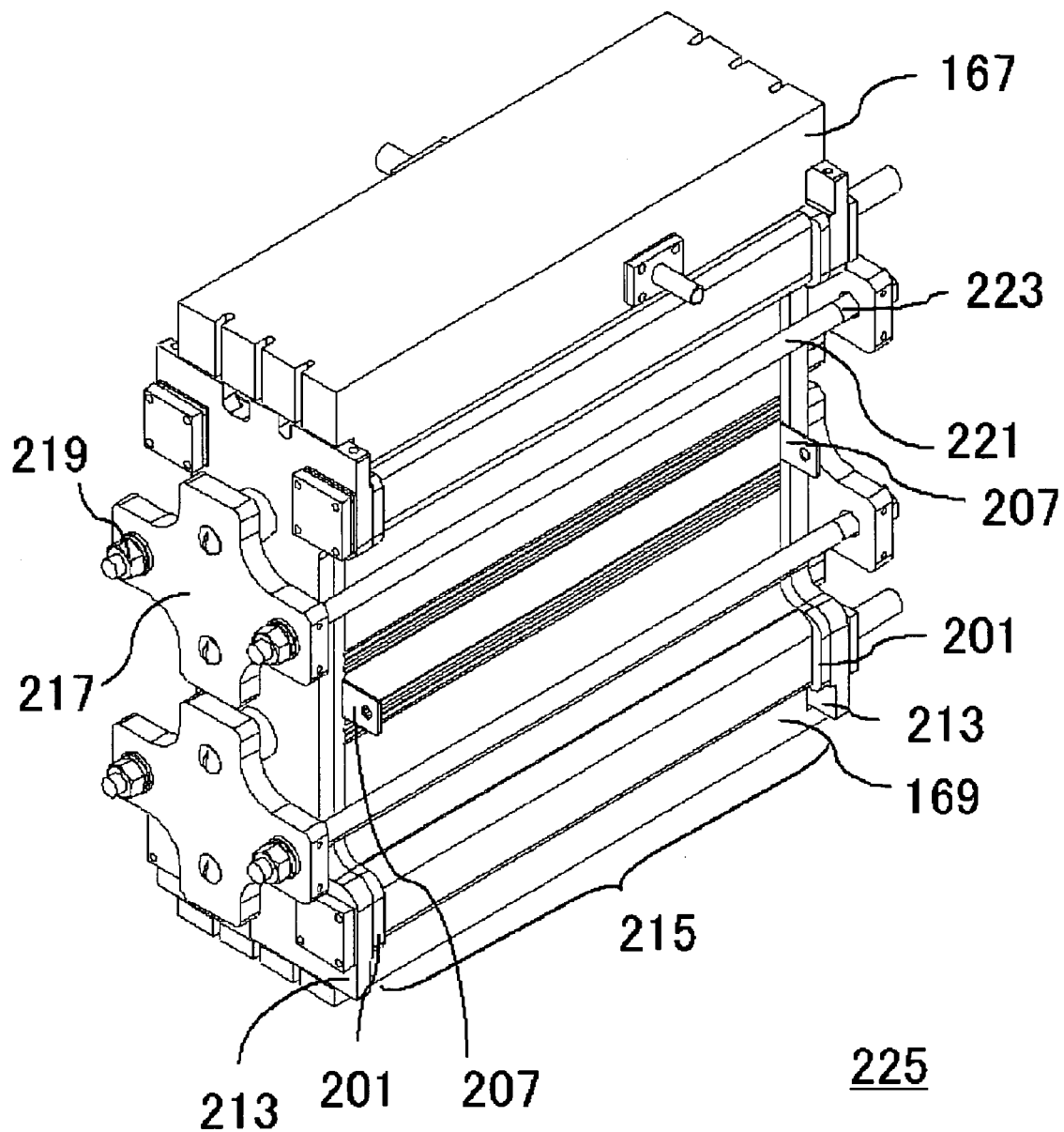
FIG. 7 is a perspective view showing a configuration of a fuel cell according to an embodiment of this invention.

This embodiment relates to a fuel cell comprising the separator for a fuel cell described in Embodiment 1 or 2. FIG. 7 is a perspective view illustrating a configuration of a fuel cell according to this embodiment. FIG. 6 illustrates a configuration of a cell stack 215 in the fuel cell in FIG. 7.

As shown in FIG. 7, a fuel cell 225 sequentially comprises the center cell stack 215, a pair of collector plates 207, a pair of insulators 201, a pair of end plates 213 and a pair of outermost tie plates 217 in an outward direction. The collector plate 207 can be used to collect electric power generated in the cell stack 215. The end plate 213 can be used to apply an even in-plane compressive load to each plate constituting the cell stack 215.

In each side, there are two tie plates 217 sandwiching the cell stack 215. The tie plates 217 are penetrated by a tie rod 221 having screws 223 at both ends, which is fastened by nuts 219. Thus, the cell stack 215, the collector plates 207, the insulators 201 and the end plates 213 are assembled by compressive load. The insulator 201 may be made of an insulative material exhibiting heat resistance at an operation temperature of the fuel cell such as PPS (polyphenylene sulfide)

Two external manifolds, i.e., the first air-feeding manifold 167 and the first air-discharging manifold 169 are provided above and under the cell stack 215, for feeding and discharging air. The periphery of the fuel cell 225 is covered by a heat insulating material (not shown). The first air-feeding manifold 167 is attached to the surface above the cell stack 215 via a fluid sealant applied. Any sealant may be used as long as it exhibits adequate heat resistance to an operation temperature of the fuel cell, for example silicon sealants.

The configuration of the cell stack 215 will be described with reference to FIGS. 6A-6B. FIG. 6A is a perspective view showing a configuration of the cell stack 215 in FIG. 7 while FIG. 6B shows a rear face of each plate in FIG. 6A. FIGS. 6A-6B show a two-cell structure as an example of stacking. A fuel-electrode side separator 101 and a separator 147 are placed in the fuel and the air electrode sides of a cell 50, respectively, to give an assembly set. The given number of the assembly sets are stacked. At the ends of the cell stack 215, an insulator 201 and an end plate 213 (not shown in FIGS. 6A-6B) are sequentially placed outwardly. The fuel-electrode side separator adjacent to the insulator 201 may be a fuel-electrode side separator 171 without a cooling water channel in place of a fuel-electrode side separator 101.

Figure 5A:
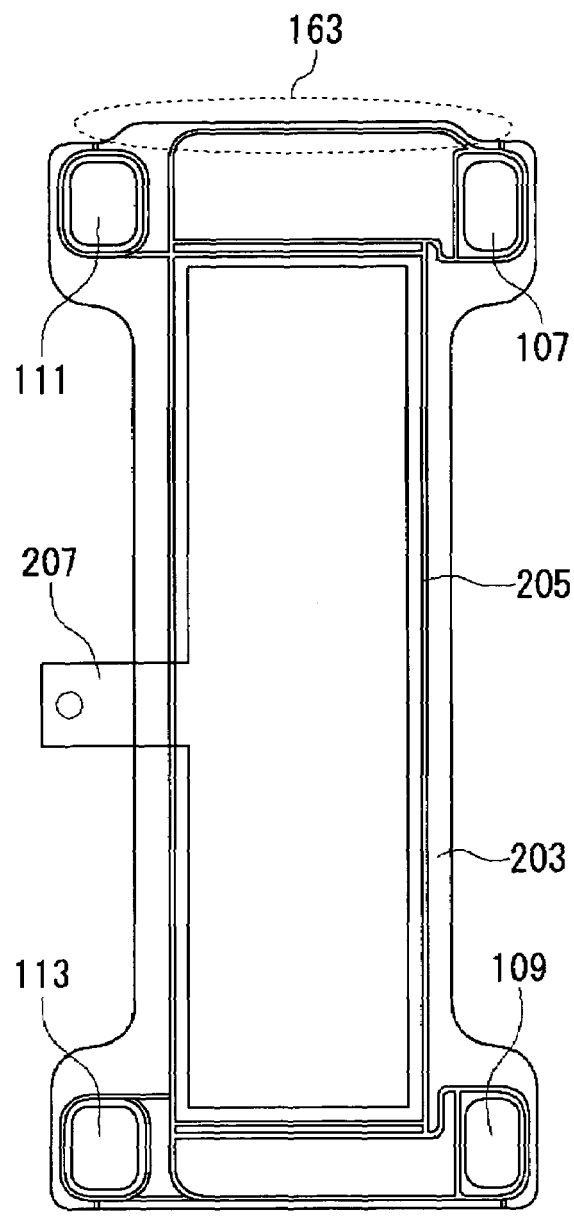
FIG. 5A shows a configuration of an insulator and FIG. 5B shows an end plate, according to an embodiment of this invention.
Figure 5B:
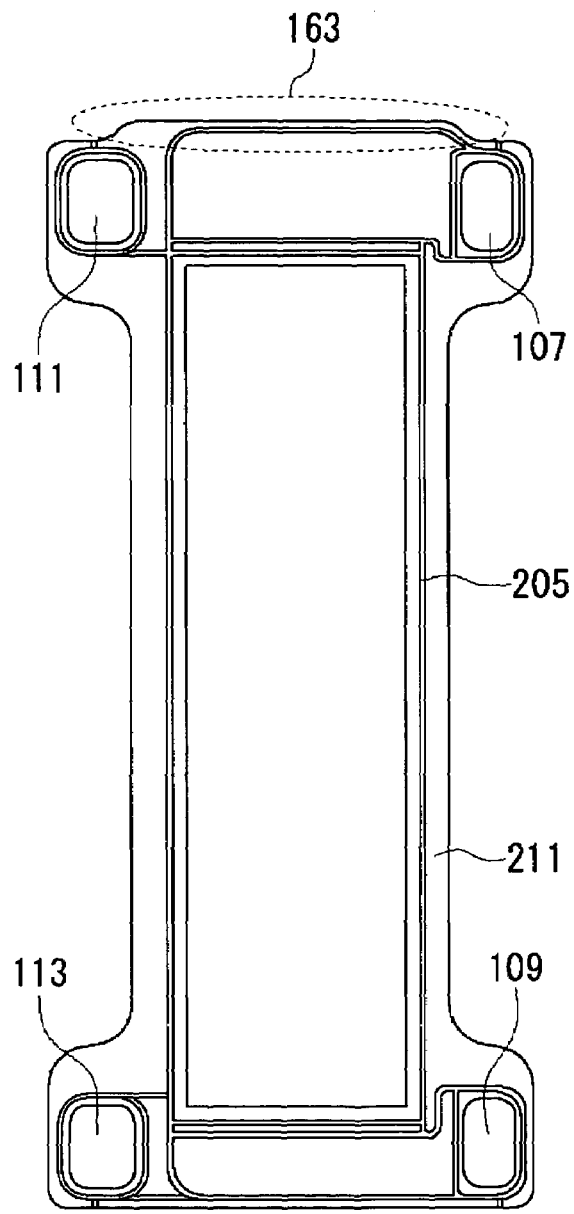

FIGS. 5A-5B show a configuration of the insulator 201 and the end plate 213. As shown in FIG. 5A, the insulator 201 comprises a substrate 203 on which are formed a first fuel-feeding manifold 107, a first fuel-discharging manifold 109, a first cooling-water-feeding manifold 111, a first cooling-water-discharging manifold 113 and a protrusion 163. In one side, a sealer (not shown) and a bead 205 are provided. There is formed a collector plate 207 protruding from the longitudinal edge of the substrate 203 for collecting electric power.

As shown in FIG. 5B, the end plate 209 also comprises a substrate 211 on which are formed a first fuel-feeding manifold 107, a first fuel-discharging manifold 109, a first cooling-water-feeding manifold 111, a first cooling-water-discharging manifold 113, a protrusion 163 and a bead 205.

Figure 8:
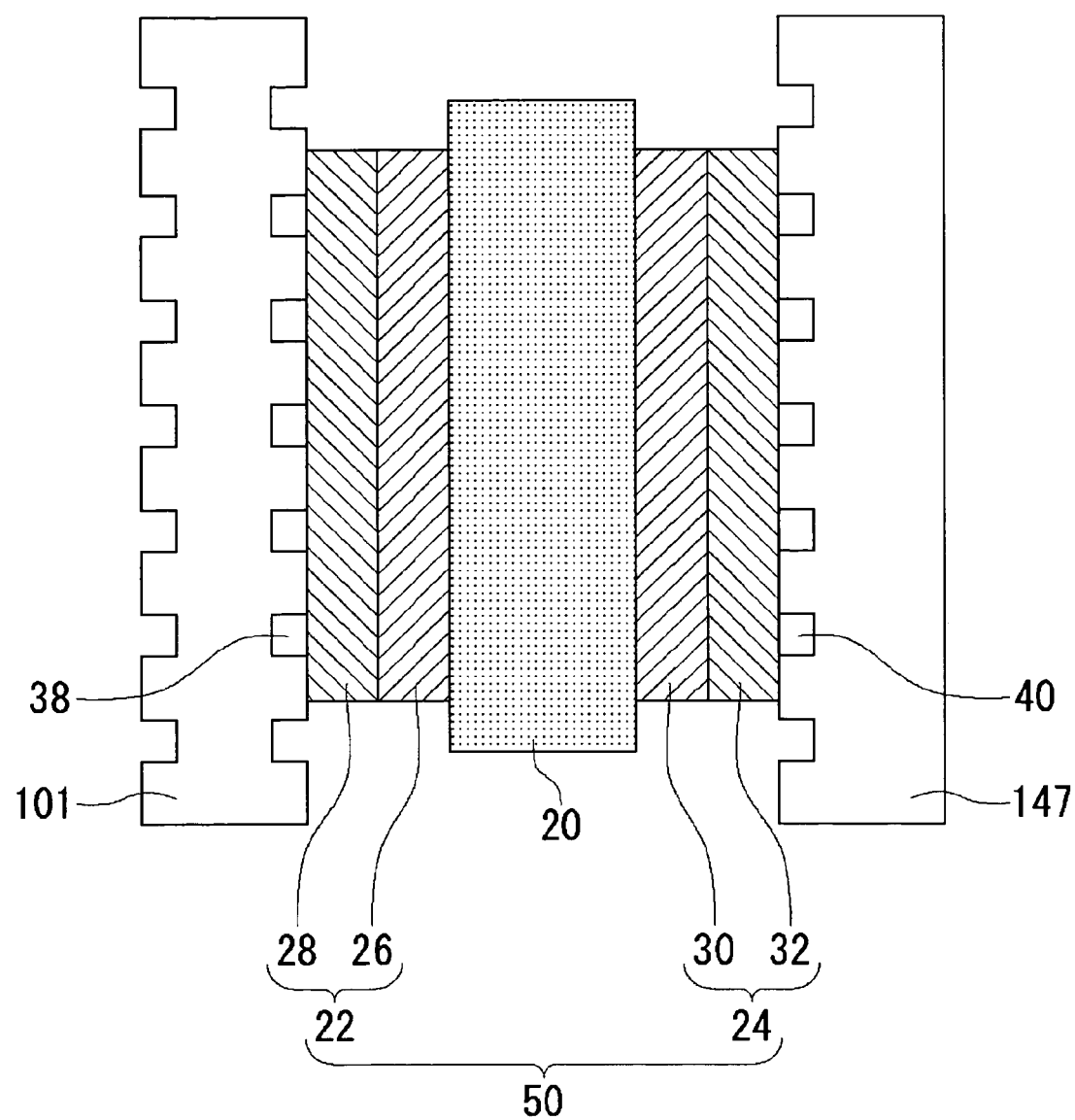
FIG. 8 shows a configuration of a cell sandwiched between separators.

Next, the configuration of the cell 50 will be described. FIG. 8 schematically shows a cross-sectional structure of the cell 50 sandwiched between the separators. In both sides of the cell 50, there are formed a fuel-electrode side separator 101 and an air-electrode side separator 147. The cell 50 comprises a solid polymer electrode membrane 20, a fuel electrode 22 and an air electrode 24. The fuel electrode 22 comprises a laminate of a catalyst layer 26 and a gas diffusion layer 28. The air electrode 24 also comprises a laminate of a catalyst layer 30 and a gas diffusion layer 32. The catalyst layer 26 in the fuel electrode 22 faces to the catalyst layer 30 in the air electrode 24 via a solid polymer electrode membrane 20.

The fuel-electrode side separator 101 comprises gas channels 38, through which a fuel gas is fed to the cell 50. The air-electrode side separator 147 also comprises gas channels 40, through which an oxidizer gas is fed to the cell 50. Specifically, during operation of the fuel cell 225, a fuel gas such as hydrogen gas is fed from the gas channel 38 to the fuel electrode 22 while an oxidizer gas such as air is fed from the gas channel 40 to the air electrode 24.

Since the solid polymer electrode membrane 20 acts as an ion-exchange membrane transferring protons between the fuel electrode 22 and the air electrode 24, it preferably exhibits good ion conductivity in a wet condition. The solid polymer electrode membrane 20 is made of a solid-polymer material such as fluoropolymers and non-fluoropolymers; for example, sulfonic perfluorocarbon polymers, polysulphone resins and perfluorocarbons having a phosphonic or carboxylic group. A sulfonic perfluorocarbon polymer may be, for example, Nafion® (DuPont) 112. Examples of a non-fluoropolymer include sulfonated aromatic polyether ether ketones and polysulfones.

The catalyst layer 26 in the fuel electrode 22 and the catalyst layer 30 in the air electrode 24 are porous, and are preferably comprised of an ion-exchange resin and carbon particles supporting a catalyst. Examples of a catalyst supported include platinum, ruthenium and rhodium, which can be used alone or in combination of two or more. Examples of the carbon particles supporting the catalyst include acetylene black, Ketchen black and carbon nanotube.

The ion-exchange resin connects the carbon particles supporting the catalyst with the solid polymer electrode membrane 20 and transfers protons between these. The ion-exchange resin may be made of a polymer material described for the solid polymer electrode membrane 20.

The gas-diffusion layer 28 in the fuel electrode 22 and the gas-diffusion layer 32 in the air electrode 24 also feed hydrogen gas or air to the catalyst layer 26 and catalyst layer 30, and further transfer a charge generated by the power-generating reaction to the external circuit and discharge water or unreacted gases. The gas-diffusion layer 28 and the gas-diffusion layer 32 are preferably made of an electron-conducting porous material; for example, a carbon paper and a carbon cloth.

The fuel cell 225 of this embodiment has the above compact and light-weight configuration. A fuel-feeding and a fuel-discharging members are formed in the same side as the channels without crossing over the channels. Therefore, even when the fuel cell 225 is placed sideways such that the first fuel-feeding manifold 107 and the first fuel-discharging manifold 109 are lower while the first cooling-water-feeding manifold 111 and the first cooling-water-discharging manifold 113 are upper, deposition of condensed water in the pathways of the fuel is prevented so that the fuel can be efficiently circulated. It is because the fuel-electrode side separator 101 is designed to efficiently discharge condensed water. Thus, the fuel cell 225 has a configuration with a higher freedom in an installation direction.

A feeding rate of air is larger than that of a fuel gas, requiring a larger manifold and a larger feeding port. In this embodiment, air is fed from the longitudinal edge of the rectangular second manifold to ensure a desired feeding amount of air. In the light of a layout of the whole fuel cell 225, it is preferable to use an external manifold which allows feeding of gases from different directions, for feeding air from the longitudinal edge of the second manifold. Furthermore, since the upper seal 137 is formed in each separator used in this embodiment, leakage of air from a gap between separators can be prevented when using an external manifold.

Since air is fed from the protrusion 163, condensed water flows to the side of the protrusion 163 even when using a wet air, so that the water can be prevented from entering the channels.

Furthermore, since a fuel and air are fed through the nozzle 141 in each separator, condensed water in the channels is quickly and efficiently discharged from the channels. Thus, the fuel cell 225 can stably provide a high output. Furthermore, leakage of condensed water and so forth from the fuel cell 225 can be prevented, resulting in improvement in safety.

There are no particular restrictions to the number of the cells stacked in the fuel cell according to this embodiment, and the fuel cell maybe, for example, a stack of 100 cells.

This invention has been described with reference to the embodiments. These embodiments are illustrative, and the skilled in the art will appreciate that many variations in a combination of the components or the manufacturing processes may be feasible and that such variations are within this invention.

For example, the above embodiment has a configuration where one cell 50 comprises one cooling water channel 106. However, when a further thinner fuel cell is needed, a stacking pattern may be changed as long as an adequate cooling efficiency can be ensured; for example, one cooling water channel 106 maybe formed per two cells 50.

Furthermore, in the fuel-electrode side separator 101 or the air-electrode side separator 147, the sealer 133 or the sealer 151 around the channels may be provided on a surface other than the above-mentioned surface, for example, the surface comprising the fuel channels 105 or the flat surface.

Although the cooling water channels 106 are formed in the rear surface to the fuel channels 105, they may be formed in there rear surface to the air channels 153. Furthermore, although the insertion port for a voltage measuring terminal 161 is formed in the air-electrode side separator 147, it may be formed in the fuel-electrode side separator 101.

As described in Embodiments 1 to 3, this invention can provide a separator for a fuel cell in which a fuel, air or cooling water can be evenly and efficiently fed. This invention can also provide a separator for a fuel cell in which condensed water in a fuel or air can be efficiently discharged from a unit cell in the fuel cell. This invention can also provide a separator for a fuel cell exhibiting excellent corrosion resistance. This invention can also provide a fuel cell exhibiting excellent output properties and stability.

Embodiment 4

Figure 12:
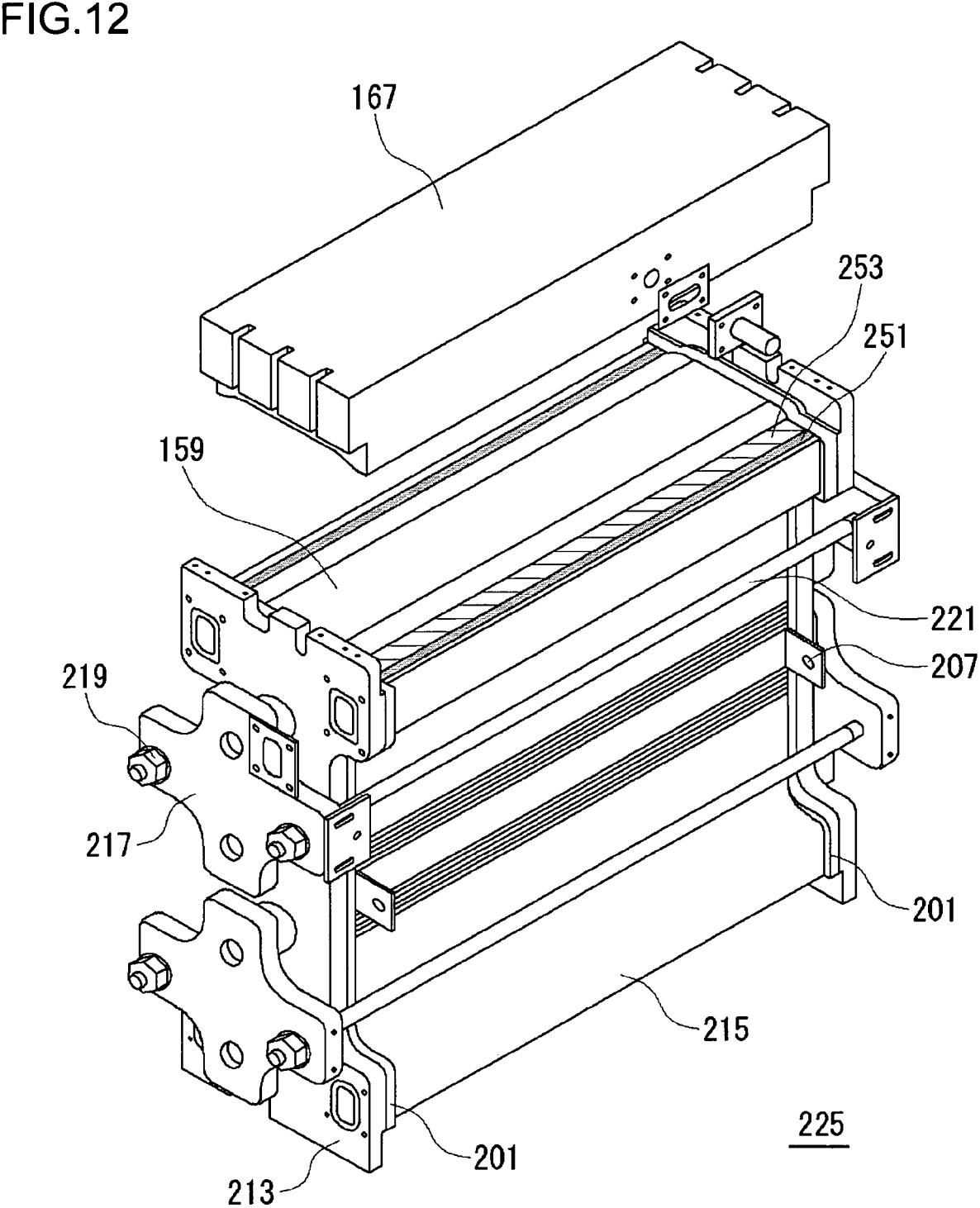
FIG. 12 is a perspective view showing a fuel cell stack according to an embodiment of this invention.
Figure 13:
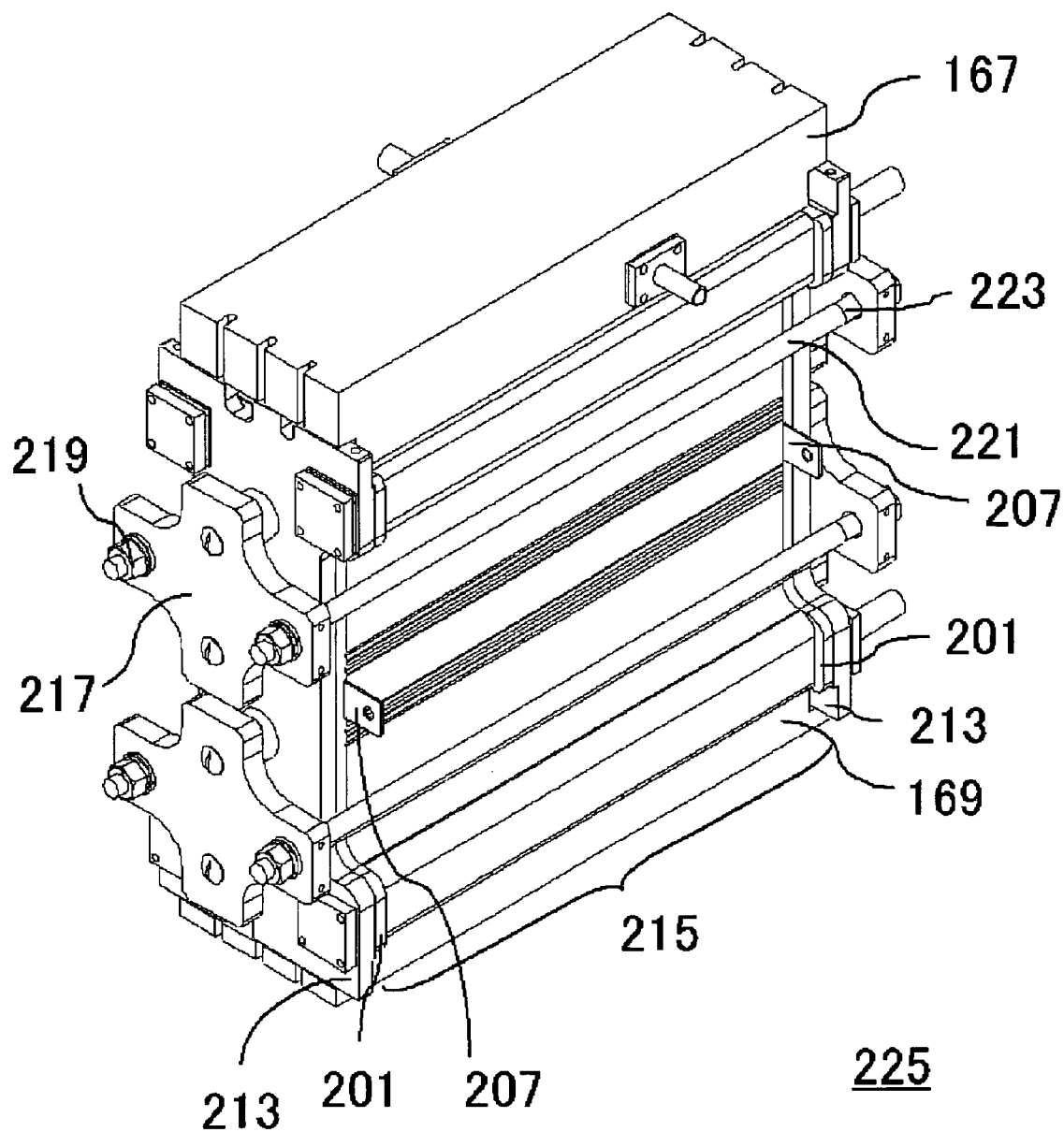
FIG. 13 is a perspective view showing combination of a manifold with the fuel cell stack in FIG. 12.

Embodiment 4 relates to a fuel cell comprising an external manifold for feeding a reaction gas. For convenience in description, Embodiment 4 may be sometimes described with reference to the drawings used for description of this invention in Embodiments 1 to 3. This fuel cell has a configuration where condensed water generated in the external manifold can be efficiently discharged from a cell as described below. FIG. 12 is a perspective view illustrating a configuration of a fuel cell stack according to Embodiment 4. FIG. 13 is a perspective view illustrating combining a manifold with the fuel cell stack in FIG. 12.

As shown in FIGS. 12 and 13, a fuel cell 225 has a substantially H-shaped cross section, in which an air introducing channel 159 protrudes. The fuel cell 225 sequentially comprises the center cell stack 215, a pair of collector plates 207, a pair of insulators 201, a pair of end plates 213 and a pair of outermost tie plates 217 in an outward direction. The collector plate 207 can be used to collect electric power generated in the cell stack 215. The end plate 213 can be used to apply an even in-plane compressive load to each plate constituting the cell stack 215.

In each side, there are two tie plates 217 sandwiching the cell stack 215. The tie plates 217 are penetrated by a tie rod 221 having screws 223 at both ends, which is fastened by nuts 219. Thus, the cell stack 215, the collector plates 207, the insulators 201 and the end plates 213 are assembled by compressive load. The insulator 201 may be made of an insulative material exhibiting heat resistance at an operation temperature of the fuel cell such as PPS (polyphenylene sulfide).

The cross section of the cell stack 215 in the stacking direction has a shape that both ends in the longitudinal direction of the rectangle protrude in the narrow-side direction, i.e., H-shaped when the narrow-side direction is vertical. Two external manifolds, i.e., the first air-feeding manifold 167 and the first air-discharging manifold 169 are provided above and under the cell stack 215, for feeding and discharging air. The periphery of the fuel cell 225 is covered by a heat insulating material (not shown). The first air-feeding manifold 167 is attached to the surface above the cell stack 215 via a fluid sealant applied. Any sealant may be used as long as it exhibits adequate heat resistance to an operation temperature of the fuel cell, for example silicon sealants.

Figure 20:
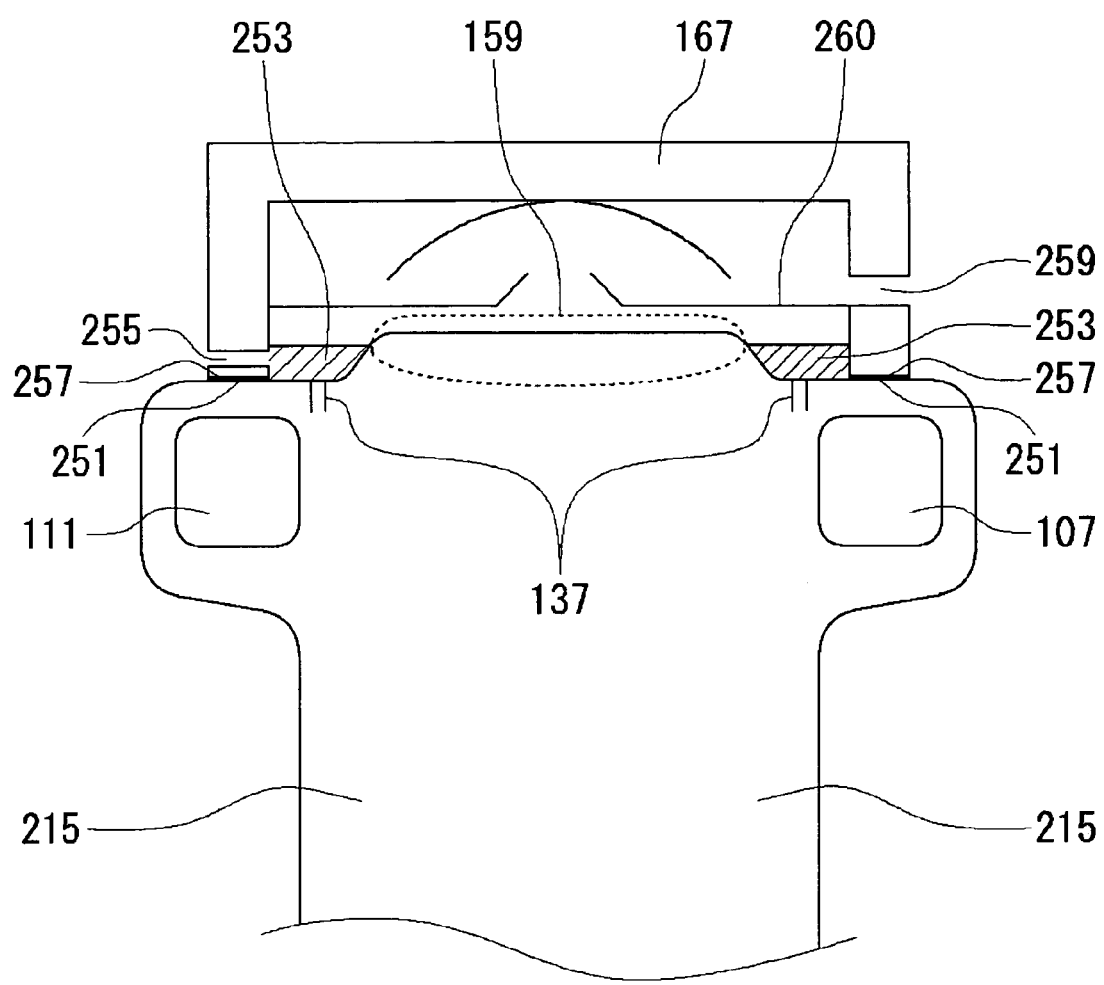
FIG. 20 is a cross section schematically showing combination of a first manifold for feeding air with a surface above the fuel cell stack in FIG. 12.

In the fuel cell of Embodiment 4, wet air introduced from a first air-feeding manifold 167 is fed from an air introducing channel 159 formed in the upper surface of the cell stack 215 into the cell stack 215. FIG. 20 is a cross section schematically illustrating combining the first air-feeding manifold 167 with the surface above the cell stack 215.

As shown in FIG. 20, the first air-feeding manifold 167 is combined with a manifold connecting area 251 in the surface above the cell stack via a sealant 257. The upper surface of the air introducing channel 159 protrudes in relation to the upper surface of the manifold connecting area 251, so that condensed water can be quickly discharged from the upper surface of the air introducing channel 159 into a water reservoir 253 and deposited therein. In the first air-feeding manifold 167, a drain 255 communicated with the outside of the first air-feeding manifold 167 is formed, corresponding to the position where the water reservoir 253 is formed, so that condensed water retained in the water reservoir 253 is discharged from the cell via the drain 255.

The first air-feeding manifold 167 comprises a water receiver 260 and a drain 259 and the water reservoir 253 is formed between the manifold connecting area 251 and the air introducing channel 159, so that water condensed in the first air-feeding manifold 167 is deposited in the water receiver 260 and water which reaches the air introducing channel 159 without being condensed and then condensed in the upper surface of the channel is led to the water reservoir 253.

The seal 137 is provided in the substrate in the separator constituting the cell stack 215, so that leakage of air or condensed water from the cell through the air introducing channel 159 can be prevented.

Such configurations of the cell stack 215 and the first air-feeding manifold 167 can contribute to prevent condensed water from entering the air channels, resulting in excellent cell properties.

The first air-feeding manifold 167 may be made of any material exhibiting heat resistance at an operation temperature of the fuel cell with no limitations; for example, a resin such as polyphenylene sulfide (PPS).

Figure 14A:
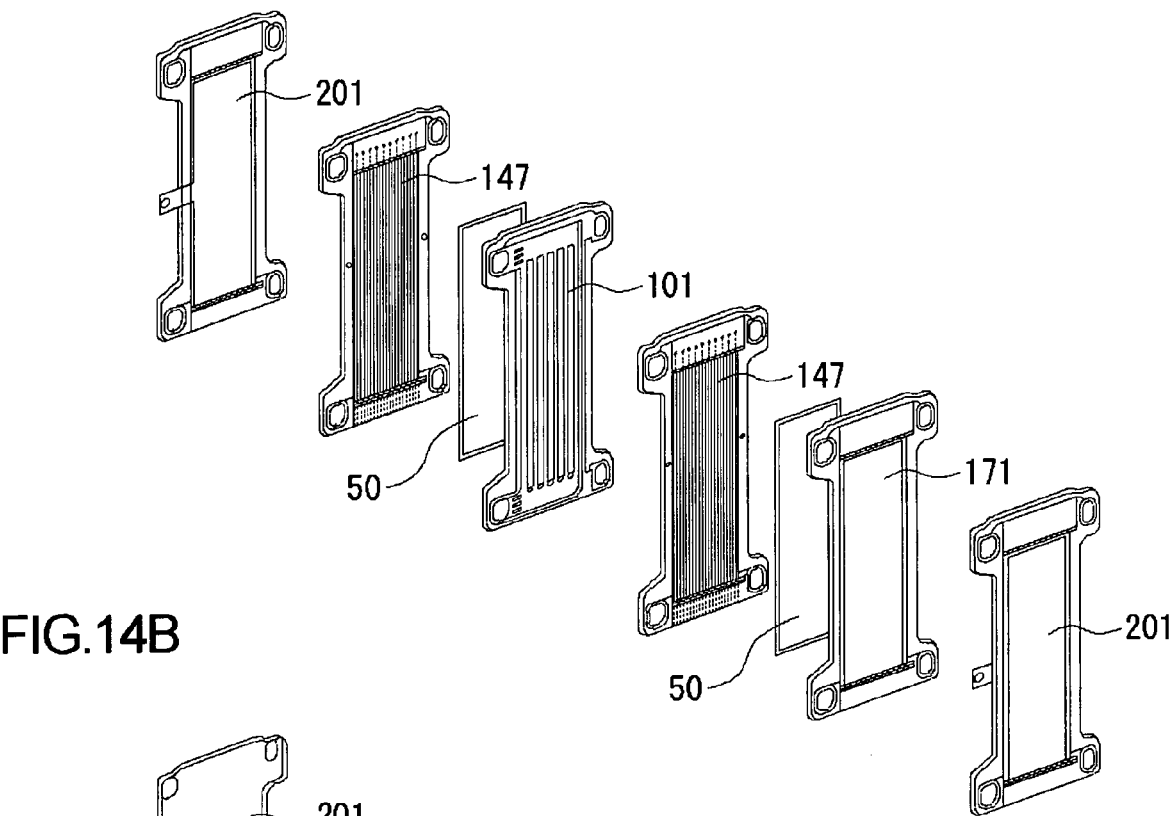
FIG. 14A is a perspective view showing a configuration of a cell stack and FIG. 14B shows a rear face of each plate.
Figure 14B:
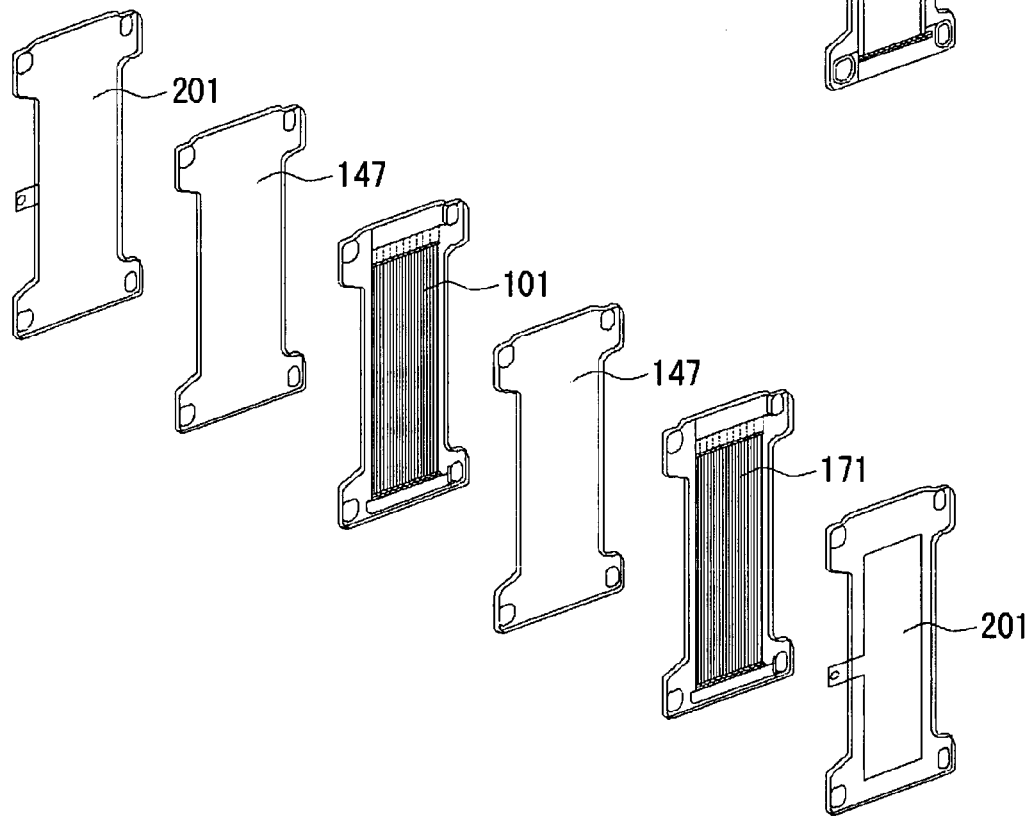

The configuration of the cell stack 215 will be described with reference to FIGS. 14A-14B. FIGS. 14A-14B illustrate a two-cell structure as an example of stacking. A fuel-electrode side separator 101 and a separator 147 are placed in the fuel and the air electrode sides of a cell 50, respectively, to give an assembly set. The given number of the assembly sets are stacked to give a stack. At the ends of the stack, an insulator 201 and an end plate 213 (not shown in FIG. 14) are sequentially placed outwardly. The fuel-electrode side separator adjacent to the insulator 201 may be a fuel-electrode side separator 171 without a cooling water channel in place of a fuel-electrode side separator 101.

The configurations of the fuel-electrode side separator 101 and the air-electrode side separator 147 will be described with reference to FIGS. 15A to 18B.

FIGS. 15A-15B show a configuration of a substrate 103 in the separator for a fuel cell according to this embodiment. The substrate 103 is H-shaped where the width direction is vertical, i.e., both ends in the longitudinal direction of the rectangle protrude to the width direction. In one surface of the substrate 103, fuel channels are formed as shown in FIG. 15A, while in the other surface, cooling water channels are formed as shown in FIG. 15B. These surfaces will be individually described in detail.

FIG. 15A shows the surface of the substrate 103 where fuel channels are formed. A fuel is fed from a first fuel-feeding manifold 107 through a fuel introducing channel 125 to a second fuel-feeding manifold 115, from which the fuel is then fed to fuel channels 105. After passing through the fuel channels 105, the fuel flows through a second fuel-discharging manifold 117, then through a fuel-discharging channel 127, to a first fuel-discharging manifold 109, and is finally discharged to the outside of the substrate 103.

FIG. 15B shows the surface of the substrate 103 where cooling water channels are formed. Cooling water flows from a first cooling-water-feeding manifold 111, through a cooling water introducing channel 129, to a second cooling-water-feeding manifold 119, from which the cooling water is then fed to cooling water channels 106. After passing through the cooling water channels 106, the cooling water flows from a second cooling-water-discharging manifold 121, through a cooling-water-discharging channel 131, to a first cooling-water-discharging manifold 113, and is finally discharged to the outside of the substrate 103.

As shown in FIGS. 15A-15B, the second fuel-feeding manifold 115 and the second cooling-water-feeding manifold 119 are substantially rectangular, and three edges other than the edge communicated with the channel are used for feeding a fuel gas, cooling water and air, respectively, as described later. A flow direction of a fuel gas or cooling water in the first manifold is perpendicular to that of the fuel gas or cooling water in the second manifold. Furthermore, a flow direction of a fuel gas or cooling water in the second manifold is also perpendicular to that in the fuel channels 105 or the cooling water channels 106. By providing the second manifold between the first manifold and the channels and setting the flow direction of the fuel gas or cooling water in such a manner, the fuel and cooling water can be efficiently fed in a limited space.

The fuel channels 105 or the cooling water channels 106 are aligned in parallel with the rectangular area. An edge ratio of the rectangular in which the fuel channels 105 or the cooling water channels 106 are formed may be, for example, about 1/2 to 1/4 in shorter edge/longer edge. The reasons are as follows.

For efficient contribution of a fuel gas fed into the separator to a reaction within a limited separator size, it is preferable to reduce the number of the channels and increase a flow rate of the fuel gas flowing in the channels. Furthermore, a larger flow rate is preferable in the light of blowing out or discharging condensed water retained in the channels.

After our investigation in the light of these conditions, it has been found that the above edge ratio may provide a fuel cell exhibiting a higher power-generation efficiency.

FIG. 16 shows a fuel-electrode side separator 101 comprising the substrate 103. FIGS. 16A and 16B correspond to the surfaces in FIGS. 15A and 15B, respectively. Protrusions 123 are formed in the second fuel-feeding manifold 115, the second cooling-water-feeding manifold 119 and the second cooling-water-discharging manifold 121. In the surfaces of the second fuel-feeding manifold 115 and the second cooling-water-feeding manifold 119, thin plates 144 are provided on the protrusions 123 as a support. In the second cooling-water-discharging manifold 121, a thin plate 146 is provided on the protrusion 123 as a support. Furthermore, the thin plate 144 is also provided in a part of the surface of the fuel introducing channel 125. The thin plates 144 and 146 may be made of, for example, gold clad plate or SUS. The thin plates 144 and 146 may be made of the same material or different materials.

Thus, in the separator 101 in the fuel electrode side, the thin plate 144 is used in the fuel or cooling water feeding side, i.e., in the upstream of the fuel channel 105 or the cooling water channel 106 and the thin plate 146 in the downstream of the cooling water channel 106. By providing the thin plates 144 and 146, a surface which seals the solid polymer electrode membrane can be made flat when forming a stack described later. In other words, when forming a stack, the edge of the solid polymer electrode membrane constituting the cell is sealed and joined with the separator, and when being directly sealed on the second manifold, it is attached to the surface of the substrate 103 having a step. The thin plates 144 and 146 attached to the surface can improve reliability of the sealing. Since the protrusions 123 are formed in the second fuel-feeding manifold 115, the second cooling-water-feeding manifold 119 and the second cooling-water-discharging manifold 121, pathways for a fuel or cooling water are ensured between these second manifolds and the metal plates. The expensive thin plate 144 is used only in the upstream of the fuel channels 105 or the cooling water channels 106, so that while preventing impurities such as corrosive components from entering the fuel channels 105 or the cooling water channels 106, an inexpensive thin plate 146 can be used to reduce a cost in the downstream. Therefore, a fuel cell exhibiting excellent output properties can be manufactured with a lower cost.

Figure 22:
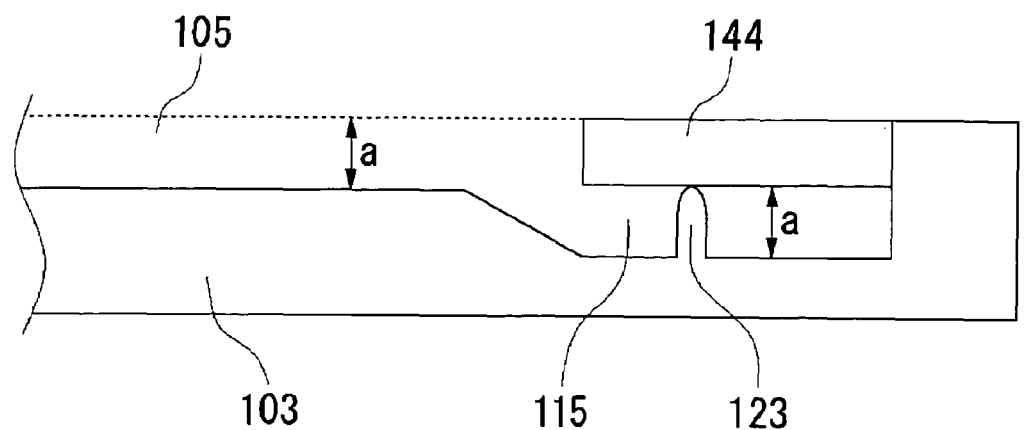
FIG. 22 illustrates a configuration of the separator for a fuel cell in FIG. 15.

In the fuel introducing channel 125 communicating the fuel channel 105 with the second fuel-feeding manifold 115, the substrate 103 preferably has a step. FIG. 22 is a cross section of the substrate 103 in the direction from the fuel channel 105 to the second fuel-feeding manifold 115. As shown in FIG. 22, the second fuel-feeding manifold 115 comprises the thin plate 144. Thus, when a depth of the bottom of the second fuel-feeding manifold 115 is equal to the depth of the fuel introducing channel 125 or the fuel channels 105, the fuel channels in the second fuel-feeding manifold 115 is shallower in relation to these.

As shown in FIG. 22, a step is formed in the channel such that a depth from the bottom of the thin plate 144 to the bottom of the second fuel-feeding manifold 115 is equal to a depth ("a") of the fuel channel 105. Thus, the depth of the fuel channels in the second fuel-feeding manifold 115 can be substantially equal to the depth of the fuel introducing channel 125 or the fuel channel 105, resulting in smooth feeding of the fuel gas. Such a configuration may be also employed in the fuel gas discharging side or the cooling water feeding or discharging side.

In FIGS. 15A and 16A, the fuel introducing channel 125 communicating the first fuel-feeding manifold 107 with the second fuel-feeding manifold 115 is not perpendicular but oblique to the longitudinal direction of the fuel channels 105. By such a configuration, retention of condensed water can be prevented in the fuel introducing channel 125 when a humidified fuel gas is fed from the first fuel-feeding manifold 107. On the contrary, in the fuel-discharging channel 127, condensed water contained in the fuel gas introduced into the fuel-discharging channel 127 from the fuel channels 105 can be more quickly and efficiently moved to the first fuel-discharging manifold 109 and then discharged to the outside of the cell.

As shown in FIGS. 15B and 16B, a sealer 133 is glued on the surface of the substrate 103 around the cooling water channels 106, and a two-line bead 135 is formed. Therefore, when forming a stack by stacking the separators according to Embodiment 4, adhesiveness to another separator is so good that leakage of gases or water can be suitably prevented. Examples of a sealer which can be used include EPDM (ethylene-propylene-dien rubber) and silicone rubbers. The substrate 103 comprises the above seal 137.

Next, a separator for a fuel cell comprising air channels in one side will be described. FIGS. 17A-74B show a configuration of a substrate 149 in a separator for a fuel cell according to this embodiment. The substrate 149 has the same shape as the substrate 103 described in this embodiment. Therefore, the following description will be mainly related to elements different from those in the substrate 103. In one side of the substrate 149, air channels are formed as shown in FIG. 17B, while the other side is flat as shown in FIG. 17A.

Figure 23A:
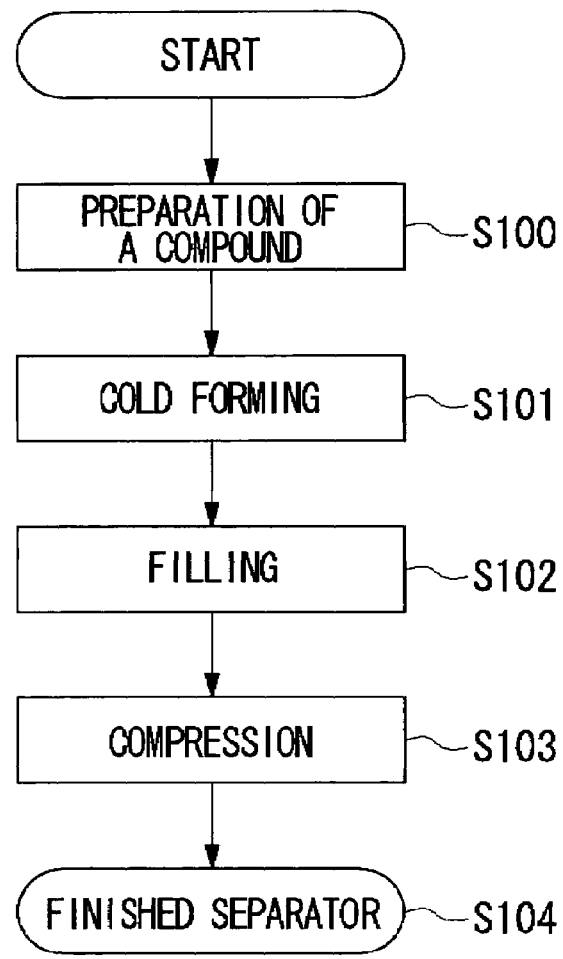
FIG. 23A illustrates a process for manufacturing a separator for a fuel cell and FIG. 23B shows a situation of manufacturing.
Figure 23B:
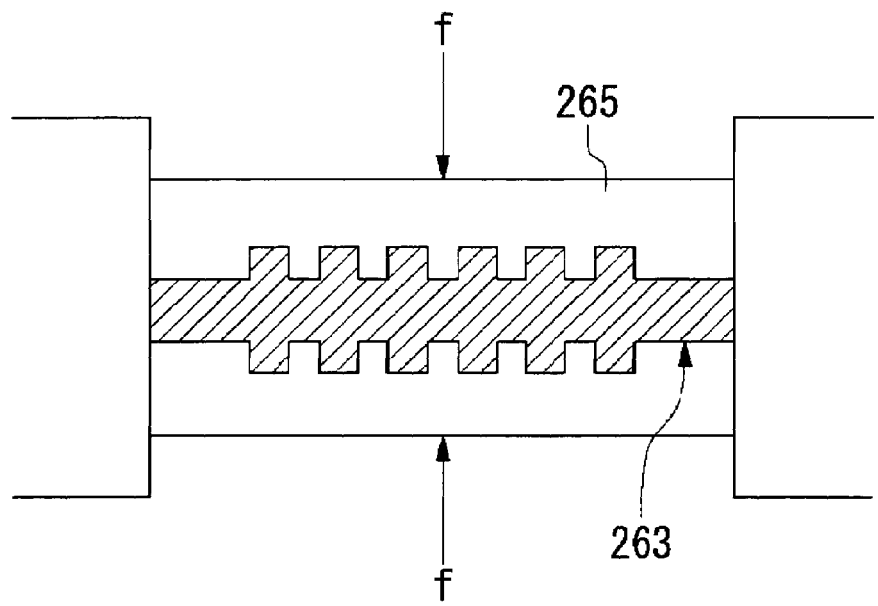
Figure 24:
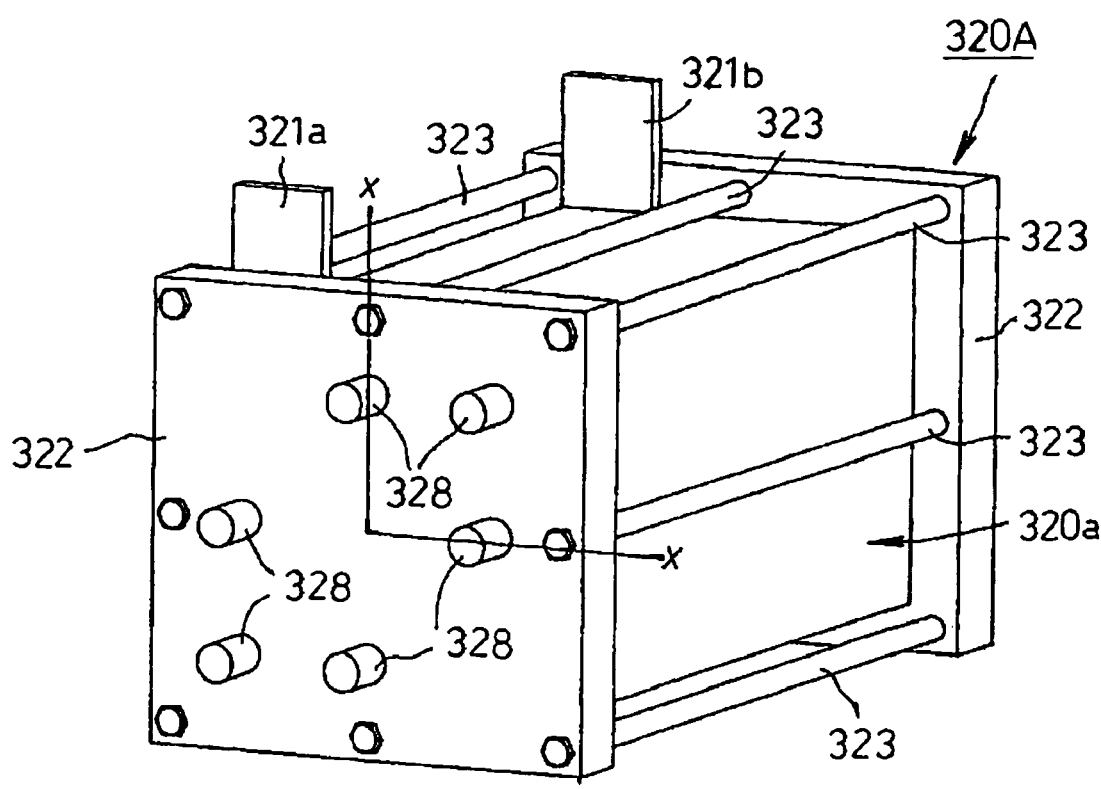
FIG. 24 is a figure described in WO 00/39872 as FIG. 2.

There will be described a process for preparing the substrate 103. FIGS. 23A-23B illustrate a process for manufacturing a separator for a fuel cell.

The substrate 103 may be prepared by molding a mixture of carbon powder and thermosetting resin powder. The resin powder may act as a binder to facilitate molding, and therefore, an inexpensive plate can be obtained. A compounding ratio of carbon powder and thermosetting resin powder may be, for example, about 1:1 to 19:1.

FIG. 23A illustrates the steps for preparing the substrate 103 and FIG. 23B illustrates situation. The "separator" in FIG. 23 corresponds to the substrate 103. As shown in FIG. 23A, graphite powder and a thermosetting resin are homogeneously mixed to prepare a desired compound (S100). A bearing within a range of 2 to 10 MPa is applied to the compound for preliminarily cold-forming the compound to a shape similar to the final molding shape (S101). Then, as shown in FIG. 23B, the preforming body is placed in a mold 265 having a given final shape (S102) Then, while heating a mold 265 to 150 to 170° C., a press (not shown) is operated. During the process, as shown in FIG. 23B, a bearing within a range of 10 to 100 MPa, preferably 20 to 50 MPa is applied in the direction of the arrow (S103), to give a separator 263 having a final shape corresponding to the mold 265 (S104).

In the separator 263 prepared as described above, the compound is pre-molded to a shape similar to the final shape, the preforming body is placed in the mold 265, and then as heating it to 150 to 170° C., a high molding bearing at 10 to 100 MPa (preferably, 20 to 50 MPa) is applied, during which as the thermosetting resin is melted, a thermosetting reaction can be initiated to uniformly form the separator 263 with a higher molding density and a desired shape.

The substrate 149 also comprises, as in the substrate 103, a first fuel-feeding manifold 107, a first fuel-discharging manifold 109, a first cooling-water-feeding manifold 111 and a first cooling-water-discharging manifold 113, and channels for a fuel or cooling water are formed.

As shown in FIG. 17B, in the side comprising the air channels, air fed to the first air-feeding manifold 167 passes through an air introducing channel 159, then through a second air-feeding manifold 155, to air channels 153. Then, the air passing through the air channel 153 is fed from a second air-discharging manifold 157 to a first air-discharging manifold 169, and finally discharged to the outside of the substrate 149.

FIGS. 18A and 18B show a separator 147 in the side of the air electrode, where the thin plates 144 and 146 are placed on the substrate 149. The separator 147 in the side of the air electrode also comprises, as in the separator 101 in the side of the fuel electrode, the thin plate 144 in the upstream of the air channels 153 and the thin plate 146 in the downstream.

The separator 147 in the air electrode side also comprises a sealer 151 around the region in the substrate 149 where air channels 153 are formed, to ensure adhesiveness by a bead 165 when stacking the separator 147.

Furthermore, the separator 147 in the air electrode side comprises an insertion port for a voltage. measuring terminal 161. Thus, a voltage measuring terminal may be inserted the insertion port for a voltage measuring terminal 161 to check an output between given cells.

The substrate 149 can be prepared as described for the substrate 103.

There will be configurations of an insulator and an end plate used in the fuel cell in FIG. 12. FIG. 19 shows configurations of an insulator 201 and an end plate 213. As shown in FIG. 19A, the insulator 201 comprises a substrate 203, on which are formed a first fuel-feeding manifold 107, a first fuel-discharging manifold 109, a first cooling-water-feeding manifold 111, a first cooling-water-discharging manifold 113 and a protrusion 163, and in one side, a sealer (not shown) and a bead 205 are formed. There is a collector plate 207 protruding from the longitudinal edge of the substrate 203 for collecting electric power.

As shown in FIG. 19B, the end plate 213 also comprises a substrate 211, on which are formed the first fuel-feeding manifold 107, the first fuel-discharging manifold 109, the first cooling-water-feeding manifold 111, the first cooling-water-discharging manifold 113, the protrusion 163 and the bead 205.

Figure 21:
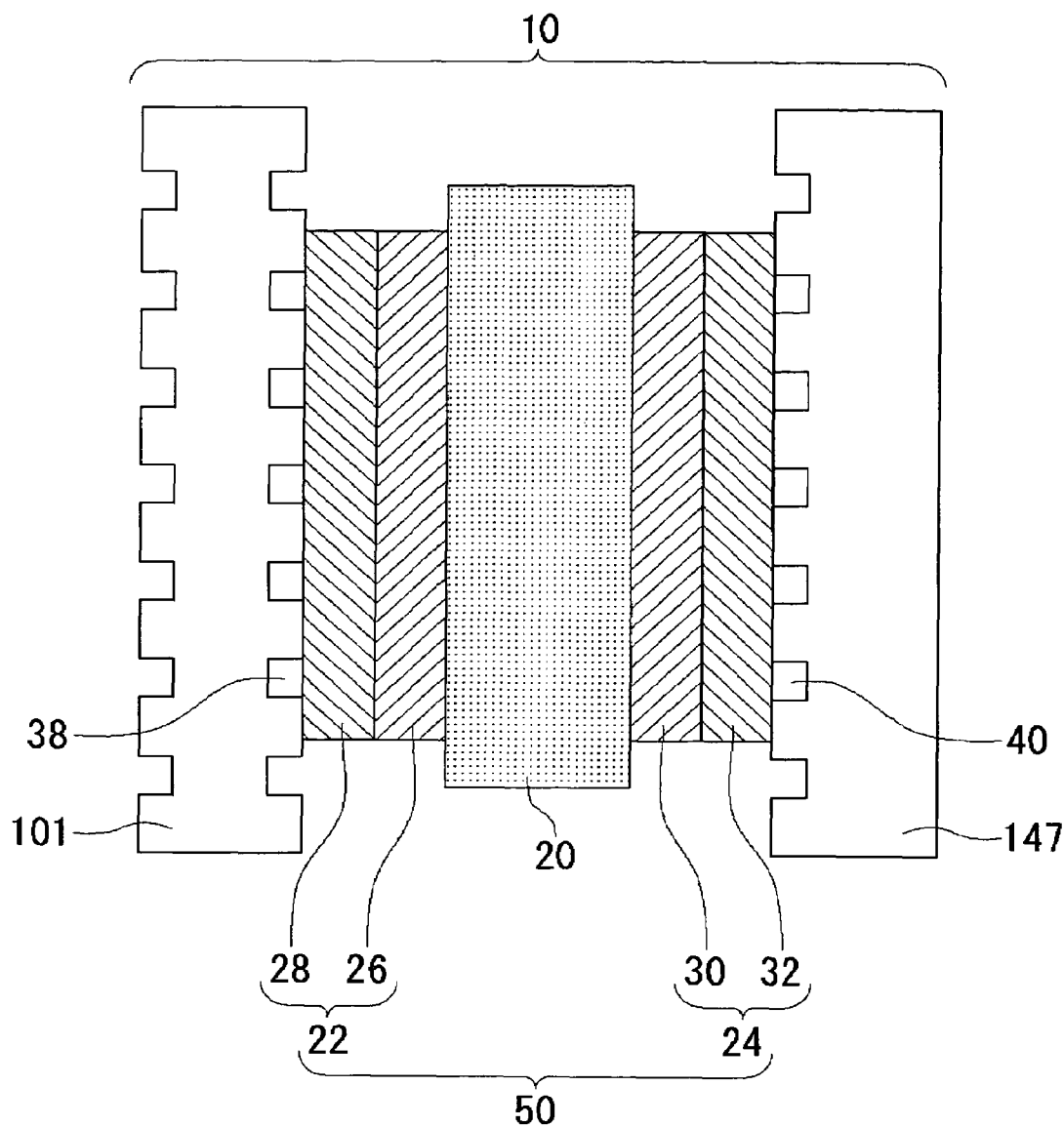
FIG. 21 shows a configuration of a cell in a fuel cell according to an embodiment of this invention.

Next, the configuration of the cell 50 will be described. FIG. 21 schematically shows a cross-sectional structure of a fuel cell 10 according to Embodiment 4. The fuel cell 10 comprises the planar cell 50, in both sides of which separators 101 and 147 are formed. In this example, only one cell 50 is illustrated, but a plurality of the cells 50 can be stacked via the separators 101 and 147 to form the fuel cell 10. The cell 50 comprises a solid polymer electrode membrane 20, a fuel electrode 22 and an air electrode 24. The fuel electrode 22 comprises a laminate of a catalyst layer 26 and a gas diffusion layer 28. The air electrode 24 also comprises a laminate of a catalyst layer 30 and a gas diffusion layer 32. The catalyst layer 26 in the fuel electrode 22 faces to the catalyst layer 30 in the air electrode 24 via a solid polymer electrode membrane 20.

The separator 101 in the side of the fuel electrode 22 comprises gas channels 38, through which a fuel gas is fed to the cell 50. The separator 147 in the side of the air electrode 24 also comprises gas channels 40, through which an oxidizer gas is fed to the cell 50. Specifically, during operation of the fuel cell 10, a fuel gas such as hydrogen gas is fed from the gas channel 38 to the fuel electrode 22 while an oxidizer gas such as air is fed from the gas channel 40 to the air electrode 24.

The solid polymer electrode membrane 20 preferably exhibits good ion conductivity in a wet condition, and acts as an ion-exchange membrane transferring protons between the fuel electrode 22 and the air electrode 24. The solid polymer electrode membrane 20 is made of a solid-polymer material such as fluoropolymers and non-fluoropolymers; for example, sulfonic perfluorocarbon polymers, polysulphone resins and perfluorocarbons having a phosphonic or carboxylic group. A sulfonic perfluorocarbon polymer may be, for example, Nafion® (DuPont) 112. Examples of a non-fluoropolymer include sulfonated aromatic polyether ether ketones and polysulfones.

The catalyst layer 26 in the fuel electrode 22 and the catalyst layer 30 in the air electrode 24 are porous, and are preferably comprised of an ion-exchange resin and carbon particles supporting a catalyst. Examples of a catalyst supported include platinum, ruthenium and rhodium, which can be used alone or in combination of two or more. Examples of the carbon particles supporting the catalyst include acetylene black, Ketchen black and carbon nanotube.

The ion-exchange resin connects the carbon particles supporting the catalyst with the solid polymer electrode membrane 20 and transfers protons between these. The ion-exchange resin may be made of a polymer material described for the solid polymer electrode membrane 20.

The gas-diffusion layer 28 in the fuel electrode 22 and the gas-diffusion layer 32 in the air electrode 24 also feed hydrogen gas or air to the catalyst layer 26 and catalyst layer 30, and further transfer a charge generated by the power-generating reaction to the external circuit and discharge water or unreacted gases. The gas-diffusion layer 28 and the gas-diffusion layer 32 are preferably made of an electron-conducting porous material; for example, a carbon paper and a carbon cloth.

An example of a preparation process for the cell 50 will be described. First, for preparing the fuel electrode 22 and the air electrode 24, a catalyst metal such as platinum is supported on catalyst-supporting carbon particles for supporting a catalyst by an appropriate method such as an impregnation and a colloid methods. The composite of the carbon particles for supporting a catalyst and the catalyst metal thus prepared is referred to as catalyst-supporting carbon particles. Next, the catalyst-supporting carbon particles and an ion-exchange resin are dispersed in a solvent to prepare a catalyst ink.

The catalyst ink thus prepared is applied to, for example, a carbon paper to be a gas-diffusion layer, and the paper is heated and dried to prepare the fuel electrode 22 and the air electrode 24. Application may be conducted by, for example, brush coating, spraying, screen printing, doctor blade application and transcription. Then, the solid polymer electrolyte membrane 20 is sandwiched between the catalyst layer 26 in the fuel electrode 22 and the catalyst layer 30 in the air electrode 24, and they are joined into a stack by hot pressing, to prepare the cell 50. When the solid polymer electrolyte membrane 20 and the ion-exchange resin 103 in the catalyst layers 26 and 30 are made of a polymer material having a softening point or glass transition point, the hot pressing is preferably conducted at a temperature higher than the softening or glass transition point.

The cell 50 may be also prepared by the following alternative method. The catalyst ink may be directly applied to the solid polymer electrode membrane 20 and dried by heating to form the catalyst layers 26 and 30. Application may be conducted by an appropriate method such as spraying. The gas-diffusion layer 28 and the gas-diffusion layer 32 may be placed on the outer surfaces of the catalyst layers 26 and 30, and then hot-pressed to prepare the cell 50. In an alternative method for preparing the cell 50, the catalyst ink is applied to, for example, a Teflon® sheet and dried by heating to form the catalyst layers 26 and 30. Application may be conducted by an appropriate method such as spraying and screen printing. Then, the solid polymer electrode membrane 20 is sandwiched between the catalyst layers 26 and 30 formed on the Teflon® sheet which face to each other. These are joined into a stack by hot pressing. Then, the Teflon® sheet is peeled off to form the gas-diffusion layer 28 and the gas-diffusion layer 32 on the outer surface of the catalyst layers 26 and 30.

Again, referring to FIG. 12, the fuel cell 225 having the above configuration is downsized and light-weighted while preventing condensed water derived from wet air from entering the air channels 153. The feeding and the discharging members for a fuel and cooling water are formed in the same side as the channels without crossing over the channels. Therefore, even when the fuel cell 225 is placed sideways, a fuel or cooling water can be efficiently circulated to prevent condensed water from being deposited in the pathway for the fuel. Since air is fed from the protrusion 163, condensed water flows to the side of the protrusion 163 even when using wet air, so that invasion into the channels can be prevented. Thus, the fuel cell 225 can stably provide a higher output. Furthermore, leakage of condensed water and soon can be prevented, resulting in improved safety.

There are no particular restrictions to the number of the cells stacked in the fuel cell according to Embodiment 4, and the fuel cell may be, for example, a stack of 100 cells.

This invention has been described with reference to Embodiment 4. The embodiment is illustrative, and the skilled in the art will appreciate that many variations in a combination of the components or the manufacturing processes may be feasible and that such variations are within this invention.

For example, the above embodiment has a configuration where one cell 50 comprises one cooling water channel 106. However, when a further thinner fuel cell is needed, a stacking pattern may be changed as long as an adequate cooling efficiency can be ensured; for example, one cooling water channel 106 may be formed per two cells 50.

Furthermore, in the fuel-electrode side separator 101 or the air-electrode side separator 147, the sealer 133 or the sealer 151 around the channels may be provided on a surface other than the above-mentioned surface, for example, the surface comprising the fuel channels 105 or the flat surface.

Although the cooling water channels 106 are formed in the rear surface to the fuel channels 105, they may be formed in the rear surface to the air channels 153. Furthermore, although the insertion port for a voltage measuring terminal 161 is formed in the air-electrode side separator 147, it may be formed in the fuel-electrode side separator 101.

As described above, Embodiment 4 of this invention can provide a fuel cell and a separator for a fuel cell, where condensed water derived from a reaction gas can be efficiently discharged from the fuel cell. Furthermore, this invention can provides a fuel cell and a separator for a fuel cell, whereby a higher output can be stably provided.

Embodiment 5

A preferred fifth embodiment of this invention will be described with reference to FIGS. 25 to 27. Since the embodiment described below is a preferred example, there are various technically-preferable restrictions, but the range of this invention is not limited to these specific aspects unless particularly indicated in the following description.

Figure 25:
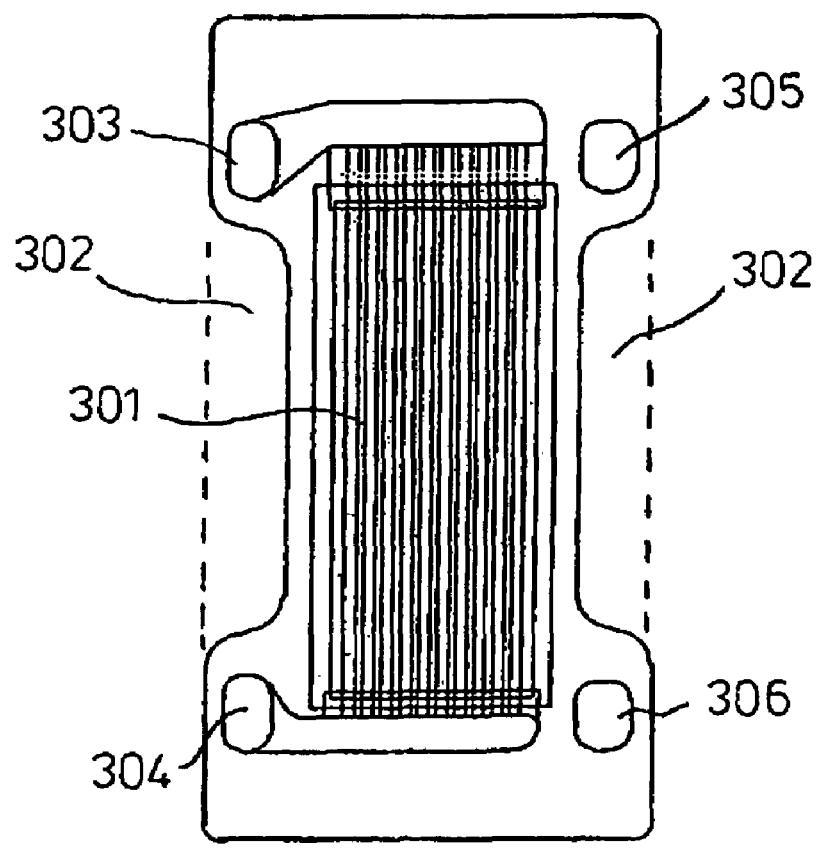
FIG. 25 is a plan view showing an example of a separator for a fuel cell according to this invention.
Figure 26:
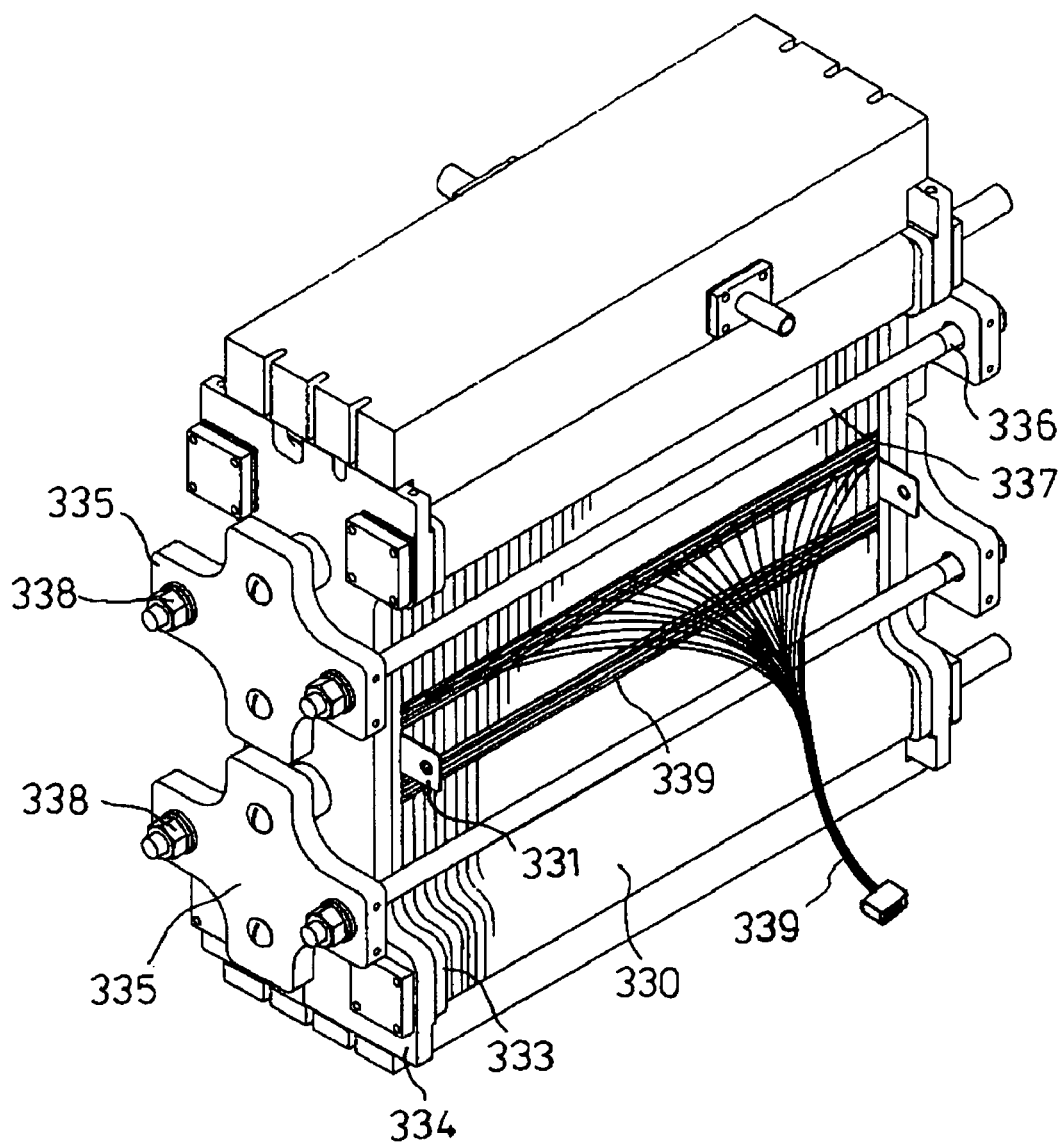
FIG. 26 is a perspective assembly drawing showing an example of a fuel cell according to this invention.

FIG. 25 is a plan view illustrating an example of a separator for a fuel cell according to this invention. In the separator, continuous grooves 301 comprising a convex and a concave to be channels for a reaction gas are aligned such that a ratio of a distance between both ends in the longitudinal direction of the grooves 301 to a width of the region where the grooves 301 are formed is about 2/1 to 4/1. These grooves 301 are formed in a rectangular area. A shape of the separator is a rectangle one of whose edge is the longitudinal length of the grooves 301, in which at the center of the longitudinal length, there is a notch 302 extending to the inside along the width direction and the corners have a fuel gas inlet 303, a fuel gas outlet 304, a cooling water inlet 305 and a cooling water outlet 306, respectively. That is, the notch 302 is formed in a peripheral area of the substantially-center of the rectangular area in the longitudinal length where the grooves 301 are formed FIG. 26 is a perspective assembly view illustrating a fuel cell according to this invention. The fuel cell of this embodiment comprises unit cells comprising the above separator for a fuel cell as a component. The unit cell is formed by first sandwiching a polymer electrolyte membrane (not shown) as a central part between the fuel and the air electrodes to be catalyst electrodes, disposing a porous supporting layer as a collector and then the above separator for a fuel cell comprising the feeding channels for a fuel gas and an oxidizer gas and comprising the notch extending to the inside along the width direction on the outer surfaces of the electrodes, and finally joining them into an assembly. Centering a stack 330 of the unit cells having the above configuration are sequentially in an outward direction disposed a pair of collector plates 331 for collecting electric power generated in the stack 330, a pair of insulators 333 for ensuring electric insulation and a pair of end plates 334 for applying an even compressive load in plane to the stack 330, and further two outermost tie plates 335 in each side for applying a load to the end plates 334. There are penetrating holes in both ends of a pair of the tie plates 335 symmetrically disposed at symmetric positions via the stack 330. Screws 336 in both ends of the penetrating tie rod 337 are fastened with nuts 338 from outside, to assemble the stack 330, the collector plate 331, the insulator 333, the end plate 334 and the tie plate 335 with a compressive load.

The tie rods 337, the collector plates 331 for collecting electric power generated in a fuel cell and a voltage measuring terminal 339 for measuring a voltage of the unit cell are disposed in the notch in the assembled fuel cell.

Figure 27:
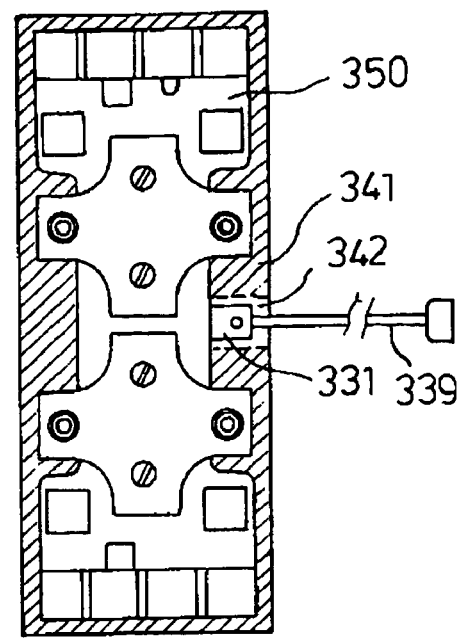
FIG. 27 is a referential side view of a fuel cell according to this invention.

FIG. 27 is a referential side view of the fuel cell according to Embodiment 5, where the fuel cell 350 is rectangularly surrounded by a heat insulating material 341. The collector plate 331 and the voltage measuring terminal 339 can be accessed from an access hole 342.

As described above, in the separator for a fuel cell and the fuel cell of this invention, the separator has a configuration where continuous grooves comprising a convex and a concave to be channels for a reaction gas are aligned such that a ratio of a distance between both ends in the longitudinal direction of the grooves to a width of the region where the grooves are formed is about 2/1 to 4/1. For efficient contribution of a gas fed into the separator to a reaction within a limited separator size, it is effective to reduce the number of the channels and increase a flow rate of the gas flowing in the channels. Furthermore, a larger flow rate is also effective because condensed water retained in the channels can be blown out to prevent gas occlusion. However, for achieving a higher power-generation capacity of a cell, a larger reaction area for the gases is required, whereas reduction in the number of the channels means reduction of the reaction area, leading to a reduced power-generation capacity. Therefore, in order to provide channels with a proper flow rate and a proper area for a fuel cell exhibiting a good power-generation efficiency, a ratio of a length between the ends of the channels to a length of the channel region along the direction perpendicular to the longitudinal length must be about 2/1 to 4/1.

Since the tie rods, the collector plates for collecting electric power generated in the fuel cell and the voltage measuring terminal are placed in the notch, the fuel cell can be shaped as a cuboid whose base is the rectangle formed by connecting the four corners in the separator, so that the fuel cell can be downsized and light-weighted.

Furthermore, heat insulating effect by the heat insulating material surrounding the fuel cell can accelerate the reaction, resulting in an improved power-generation efficiency. In particular, the notch in the fuel cell most contributes to the reaction and the heat insulating material is particularly thick in the area. The shape of the fuel cell can, therefore, very advantageously contribute to improvement in a power-generation efficiency.

Embodiment 6

Figure 28:
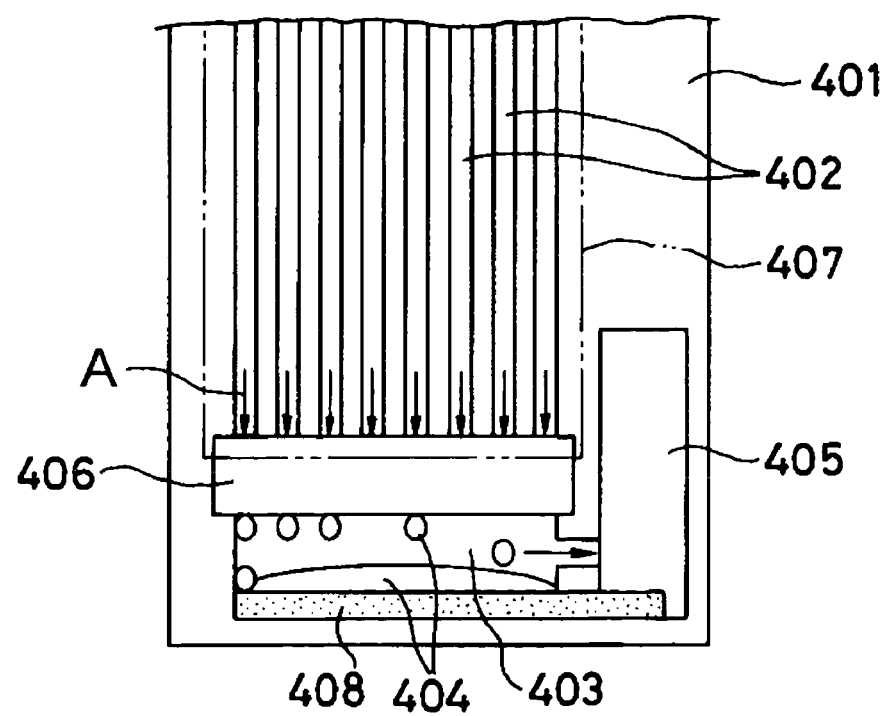
FIG. 28 is a schematic plan view showing a gas separator in an embodiment of a polymer electrolyte fuel cell according to this invention.
Figure 31:
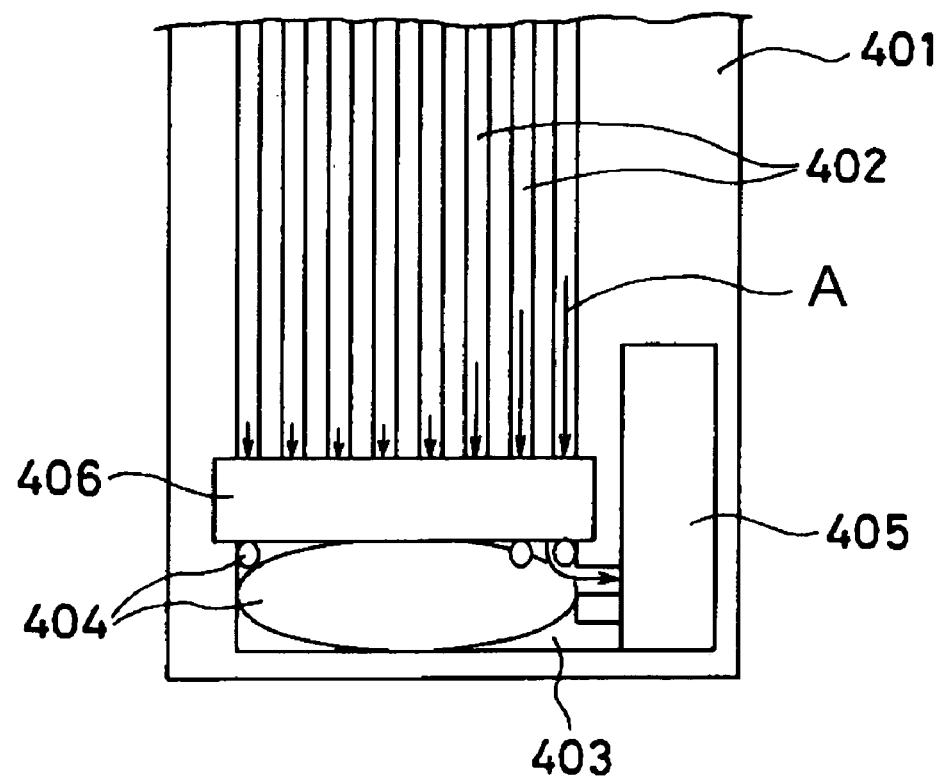
FIG. 31 is a schematic plan view showing a gas separator in the prior art.

An embodiment of a polymer electrolyte fuel cell according to this invention will be described with reference to the drawings. FIG. 28 is a schematic plan view illustrating a gas separator in the polymer electrolyte fuel cell according to this invention. Describing the same members as those in FIG. 31 with the same symbols, 401 is a gas separator made of a mixture of carbon and a resin, in which a plurality of concave groove channels 402 are aligned in parallel. Generally, the channels 402 in the gas separator 401 are formed also in the rear surface (a so-called "bipolar separator"). The arrow "A" indicates a flow direction of a reaction gas.

In the drawings, 403 is a concave header 403 communicated with the outlets of the individual channels 402 such that the channels 402 are joined in the header 403. The outlet of the header 403 is communicated with a manifold 405 opening to the stacking direction which is placed in the end of the gas separator 401.

Furthermore, 406 is a plate disposed in the gas separator such that the plate covers a connection end between the outlet of the channels 402 and the header 403, and acts as a seal for preventing leakage between the gas separator 401 and a membrane-electrode unit 407 placed on the separator.

Figure 29A:
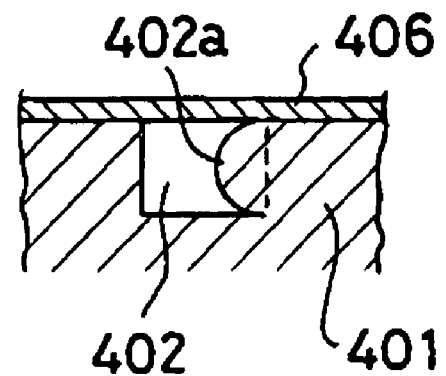
FIG. 29A is a cross-sectional view illustrating an embodiment where a protrusion is provided in a side wall of a concave-groove channel in a gas separator.
Figure 29B:
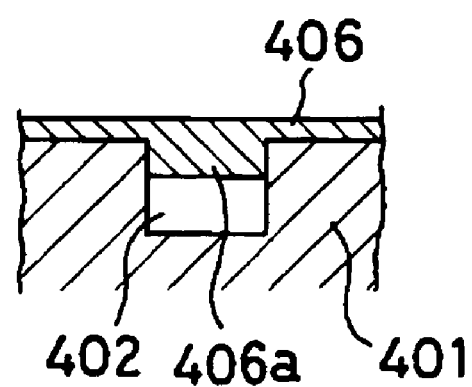
FIG. 29B is a cross-sectional view illustrating an embodiment where in the bottom of a plate, a concave corresponding to each channel is formed to reduce a depth of the channel.
Figure 29C:
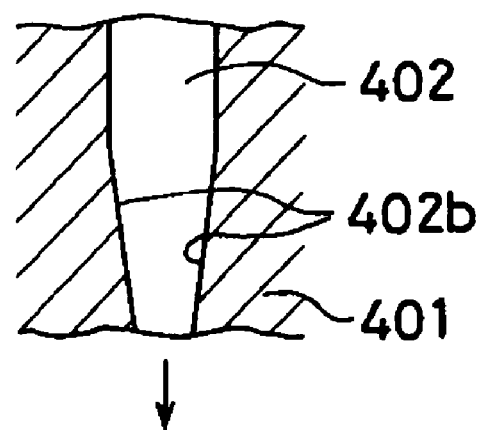
FIG. 29C is a plan view illustrating an embodiment where as getting closer to an outlet, both side walls in a channel are gradually inclined toward the inside as a taper to reduce a groove width.

In Embodiment 6, the gas separator 401 has a configuration where the end (outlet) of the channel 402 opening to the header 403 has a reduced cross-sectional area. The cross-sectional area of the end of the channel 402 can be reduced by an appropriate method such as, but not limited to, reducing a groove width of the channel 402 with a protrusion 402a in the inner wall of the concave groove channel 402 as shown in FIG. 29A; reducing a depth of the channel 402 with a convex 406a toward each channel 402 which is formed in the bottom surface of the plate 406 as shown in FIG. 29B; and reducing a groove width with a taper 402b which is gradually inclined toward the outlet in the sidewall of the channel 402 as shown in FIG. 29C.

By any of the method described above, a cross-sectional area of the end of the channel 402 can be reduced to accelerate the reaction gas flowing in each channel 402 near the outlet. As the reaction gas flow is accelerated, condensed water generated in the downstream of the channel can be rapidly discharged to the header 403 together with the unreacted gas. The unreacted gas discharged into the header 403 rushes into the manifold 405 and water droplets entrained by the gas flow in the header 403 are also forced into the manifold 405. Therefore, condensed water gathered into the header 403 is easily discharged to the manifold 405, so that water retention is prevented in the header 403, the reaction gas can smoothly flow in the channels 402, and the reaction gas can be evenly distributed, resulting in improvement in power-generation performance.

Embodiment 7

Figure 30:
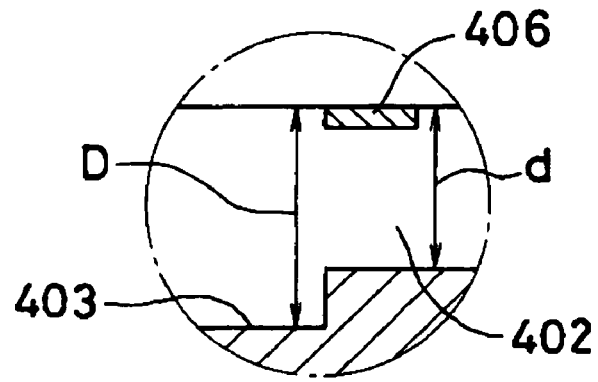
FIG. 30 is a cross section illustrating an embodiment where a header in a gas separator is deeper than a channel.

In the seventh embodiment of this invention, the header 403 is deeper than the channels 402. For example, as shown in FIG. 30, when a depth "d" of the concave groove channels 402 is 0.3 mm to 0.5 mm, a depth "D" of the header 403 is 0.5 mm to 0.7 mm, to ensure a depth difference of at least about 0.2 mm. Generally, the channels 402 and the header 403 have an equal depth. The rear face of the header 403, i.e., the other side of the gas separator 401 has another header, so that a depth of the header 403 is, of course, limited.

When a depth "D" of the header 403 is larger than a depth "d" of the channels 402 as described above, a volume of the header 403 becomes larger than a conventional header so that droplets forced into the header 403 may be prevented from contacting with each other to grow into a larger water drop. Thus, droplets can be easily discharged from the header to the manifold 405 before growing into a larger water drop, so that water retention in the header 403 can be considerably prevented.

Embodiment 8

In the eighth embodiment of this invention, the inner wall of the header 403 is made hydrophobic by an appropriate method including, but not limited to, applying a paint comprising a hydrophobic material such as a fluorine-containing paint to the inner wall (including the bottom) of the header 403 and gluing a thin sheet made of a hydrophobic material to the inner wall.

When the inner wall of the header 403 is hydrophobic as described above, droplets forced into the header 403 cannot adhere to the inner wall of the header 403, so that formation of retained water in the header 403 can be considerably prevented and discharge of droplets from the header 403 to the manifold 405 can be facilitated.

Embodiment 9

In the ninth embodiment of this invention, a water absorber connected with a manifold is placed in the header. For example, as shown in FIG. 28, a stick of a water absorber 408 is placed along the bottom edge in the header 403. The water absorber 408 may be made of, for example, a high water absorption resin or another water-absorbing material such as sponge and pulp, but not limited to these materials. Many of these materials are adequately porous or fibrous to permit capillary phenomenon. The water absorber 408 is preferable because when connecting its end to the manifold 405, absorbed water can be easily discharged to the manifold 405. Although FIG. 28 shows an example where the water absorber 408 is disposed in the bottom edge of the header 403, the water absorber 408 may be extended to a position at which it contacts with the ends of the reaction gas channels 402 in the header 403. Thus, droplets from the channel ends can be immediately absorbed by the water absorber 408, to ensure a space for reaction gas flow in the header 403.

Embodiment 10

The tenth embodiment of this invention is a combination of at least two of the configurations of channels or the header 403 in Embodiments 6 to 9, but not shown in the drawings. Combining at least two of these configurations may synergically further improve water-retention preventing effect in the header 403.

As described above, in a polymer electrolyte fuel cell comprising a gas separator having a plurality of channels through which an oxidizer gas and a fuel gas flow in the cathode and the anode sides, respectively and at the outlets of the channels, a concave header in which the channels are joined, where the reaction gases from the channel are joined in the header and then enter a duct communicated with the outlet of the header and penetrating the cell in the stacking direction, the apertures of the oxidizer gas channels or the fuel gas channels to the header have an opening area smaller than that in any of the other channel parts, so that a flow rate of the reaction gas can be increased near the channel outlet. Therefore, condensed water generated in the channels can be easily discharged into the header and can be forced into the manifold, utilizing a flow rate of the unreacted gas discharged into the header. Thus, water retention in the header can be prevented, the reaction gas can smoothly flow in the channels, and the reaction gas can be evenly distributed, resulting in improvement in power-generation performance.

Making a depth of the header larger than a depth of the channels in the above polymer electrolyte fuel cell, a volume of the header becomes larger than a conventional header so that droplets forced into the header may be prevented from contacting with each other to grow into a larger water drop. Thus, droplets can be easily discharged from the header to the manifold before growing into a larger water drop, so that water retention in the header can be considerably prevented.

The inner wall of the header in the polymer electrolyte fuel cell is hydrophobic so that droplets cannot adhere to the inner wall of the header. Thus, formation of retained water in the header can be considerably prevented and discharge of droplets from the header to the manifold can be facilitated.

The water absorber connected to the manifold is placed in the header in the polymer electrolyte fuel cell, so that water droplets in the header can be absorbed. Thus, formation of retained water in the header can be considerably prevented and absorbed water can be easily discharged to the manifold 405.

The water absorber is placed such that it contacts with the ends of the gas channels in the polymer electrolyte fuel cell, so that droplets from the channel ends can be immediately absorbed by the water absorber, to ensure a space for reaction gas flow in the header.

What is claimed is:

1. A separator for a fuel cell which functions as a separating wall between unit cells constituting a fuel cell stack and has a plurality of apertures forming channels for feeding a fuel, oxidizer or coolant in the direction of stacking the fuel cells, comprising:
   a feeding manifold communicated with any of the plurality of apertures;
   a plurality of channels communicated with the feeding manifold and extending in substantially parallel; and
   a cover plate covering the upper surface of the feeding manifold,
   wherein the cover plate is located in the feeding manifold such that the upper surface of the plate is substantially flush with the surface of the separator, and
   a step is formed between the bottom of the channels and the bottom face of the feeding manifold such that a distance between the undersurface of the cover plate and the bottom face of the feeding manifold is substantially equal to the depth of the channels.

2. The separator for a fuel cell as claimed in claim 1 wherein the feeding manifold is formed over the whole surface of the end of the channels.

3. The separator for a fuel cell as claimed in claim 1, comprising a sealer covering the surface of the separator.

4. A separator for a fuel cell which functions as a separating wall between unit cells constituting a fuel cell stack and has a plurality of apertures forming channels for feeding a fuel, oxidizer or coolant in the direction of stacking the fuel cells, comprising:
   a feeding manifold communicated with a first aperture;
   a plurality of channels communicated with the feeding manifold and extending in substantially parallel;
   a discharge manifold communicated with a second aperture; and
   first and second cover plates covering the upper surfaces of the feeding and the discharge manifolds,
   wherein the first and second cover plates are located in the feeding and discharge manifolds, respectively, such that the upper surfaces of the plates are substantially flush with the surface of the separator.

5. The separator for a fuel cell as claimed in claim 4, wherein the feeding manifold comprises a channel-resistance regulating member having a nozzle that faces a channel over the entirety of the end of the channel.

6. A fuel cell wherein a plurality of cells for a fuel cell comprising electrodes and an electrolyte sandwiched between the electrodes are stacked via the separator for a fuel cell as claimed in claim 5.

7. The fuel cell as claimed in claim 6, wherein the channels in the separator for a fuel cell are vertically aligned; the feeding manifold is formed in the upper part of the channels; and the discharge manifold is formed in the lower part of the channels.

8. The fuel cell as claimed in claim 7, comprising a connecting channel inclined upward from the first aperture connected with the feeding manifold to the feeding manifold,
   wherein the bottom of the first aperture is located below the inlet of the channel-resistance regulating member.

9. The separator for a fuel cell as claimed in claim 4, wherein the first and second cover plates are made of different materials.

10. The separator for a fuel cell as claimed in claim 4, comprising a sealer covering the surface of the separator.

* * * * *